US012639296B2

(12) United States Patent

Aggarwal et al.

(10) Patent No.: US 12,639,296 B2
(45) Date of Patent: May 26, 2026

(54) FORECASTING DATASETS USING BLEND OF TEMPORAL AGGREGATION AND GROUPED AGGREGATION

(71) Applicant: Oracle International Corporation, Redwood Shores, CA (US)

(72) Inventors: Ankit Aggarwal, Mumbai (IN); Jie Xing, Redmond, WA (US); Chirag Ahuja, Delhi (IN); Vikas Pandey, Bengaluru (IN); Hariharan Balasubramanian, Redmond, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/139,492

(22) Filed: Apr. 26, 2023

(65) Prior Publication Data

US 2024/0362210 A1     Oct. 31, 2024

(51) Int. Cl.
*G06F 16/242*       (2019.01)
*G06F 16/2455*     (2019.01)

(52) U.S. Cl.
CPC ...... *G06F 16/244* (2019.01); *G06F 16/24553* (2019.01)

(58) Field of Classification Search
None
See application file for complete search history.

(56) References Cited

U.S. PATENT DOCUMENTS 11,366,248 B2     6/2022 Schmude et al.
2015/0302432 A1     10/2015 Chien et al.

| | | | |
|---|---|---|---|
| 2018/0246941 A1* | 8/2018 | Salunke | ............. G06F 16/2477 |
| 2019/0394083 A1 | 12/2019 | Sglavo et al. | |
| 2020/0132884 A1* | 4/2020 | Rothenberg | ............. G06N 5/04 |
| 2021/0199850 A1* | 7/2021 | Schmude | ............... G06N 3/044 |
| 2022/0121664 A1* | 4/2022 | Eskreis-Winkler | ......................... G06F 16/2474 |

(Continued)

OTHER PUBLICATIONS

"Aggregating Time Series", Available Online at: https://docs. wavefront.com/query_language_aggregate_functions.html, 2022, 7 pages.

(Continued)

*Primary Examiner* — Dawaune A Conyers

(74) *Attorney, Agent, or Firm* — Kilpatrick Townsend & Stockton LLP

(57)     ABSTRACT

Techniques are described herein for forecasting datasets using blend of temporal aggregation and grouped aggregation. An example method can include a device accessing a first and second time series, comprising a first data point associated with a first time step and a first value and a second data point associated with a second time step and a second value. The method can further include the device determining a grouped aggregated data point using the first and second time series by aligning the first and second data point. The method can further include the device determining the grouped aggregated data point by summing the first and second value. The method can further include determining a grouped aggregated time series. The method can further include the device determining a first set of input values for a machine learning model. The method can further include the device determining a first forecasted future value.

20 Claims, 15 Drawing Sheets

(56)  References Cited

U.S. PATENT DOCUMENTS

| | | | | |
|---|---|---|---|---|
| 2022/0292308 A1* | 9/2022 | Schwiep | ............. | G06F 18/2163 |
| 2023/0281730 A1* | 9/2023 | Chakraborty | .......... | G06N 3/092 |
| | | | | 700/286 |
| 2024/0144090 A1* | 5/2024 | Chen | ...................... | G06N 20/00 |

OTHER PUBLICATIONS

Keith , "Multiple Series? Forecast Them together with any Sklearn Model", Available Online at: https://towardsdatascience.com/multiple-series-forecast-them-together-with-any-sklearn-model-96319d46269, Mar. 30, 2022, 15 pages.
Kourentzes et al., "Forecasting with Multivariate Temporal Aggregation: The Case of Promotional Modelling", International Journal of Production Economics, vol. 181, Nov. 2016, pp. 145-153.
Kourentzes et al., "Improving Forecasting by Estimating Time Series Structural Components Across Multiple Frequencies", International Journal of Forecasting, vol. 30, No. 2, Apr.-Jun. 2014, 30 pages.
Kourentzes , "Improving Your Forecasts Using Multiple Temporal Aggregation", Available Online at: https://kourentzes.com/forecasting/2014/05/26/improving-forecasting-via-multiple-temporal-aggregation/, May 26, 2014, 11 pages.

* cited by examiner

900

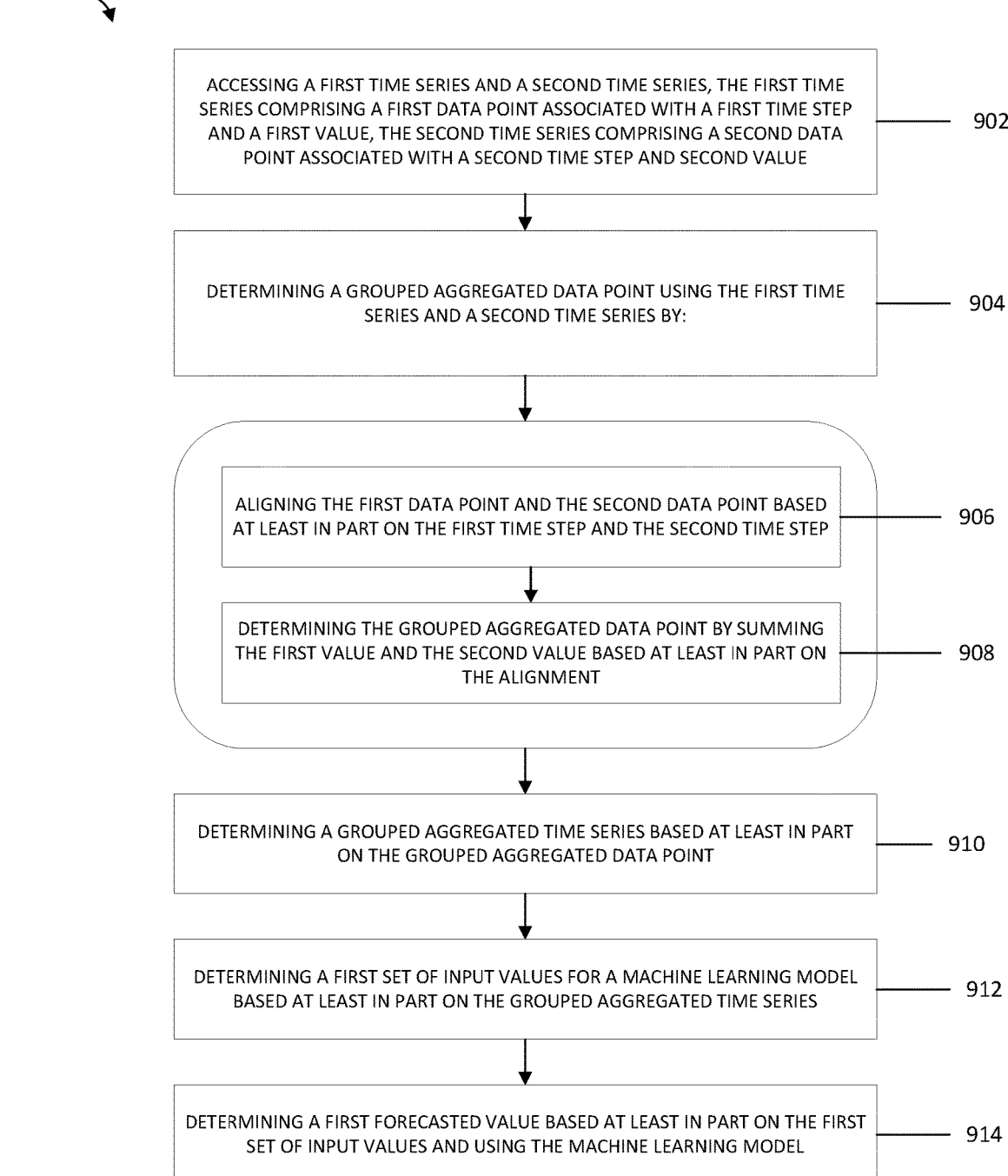

ACCESSING A FIRST TIME SERIES AND A SECOND TIME SERIES, THE FIRST TIME SERIES COMPRISING A FIRST DATA POINT ASSOCIATED WITH A FIRST TIME STEP AND A FIRST VALUE, THE SECOND TIME SERIES COMPRISING A SECOND DATA POINT ASSOCIATED WITH A SECOND TIME STEP AND SECOND VALUE — 902

DETERMINING A GROUPED AGGREGATED DATA POINT USING THE FIRST TIME SERIES AND A SECOND TIME SERIES BY: — 904

ALIGNING THE FIRST DATA POINT AND THE SECOND DATA POINT BASED AT LEAST IN PART ON THE FIRST TIME STEP AND THE SECOND TIME STEP — 906

DETERMINING THE GROUPED AGGREGATED DATA POINT BY SUMMING THE FIRST VALUE AND THE SECOND VALUE BASED AT LEAST IN PART ON THE ALIGNMENT — 908

DETERMINING A GROUPED AGGREGATED TIME SERIES BASED AT LEAST IN PART ON THE GROUPED AGGREGATED DATA POINT — 910

DETERMINING A FIRST SET OF INPUT VALUES FOR A MACHINE LEARNING MODEL BASED AT LEAST IN PART ON THE GROUPED AGGREGATED TIME SERIES — 912

DETERMINING A FIRST FORECASTED VALUE BASED AT LEAST IN PART ON THE FIRST SET OF INPUT VALUES AND USING THE MACHINE LEARNING MODEL — 914

FIG. 9

1000

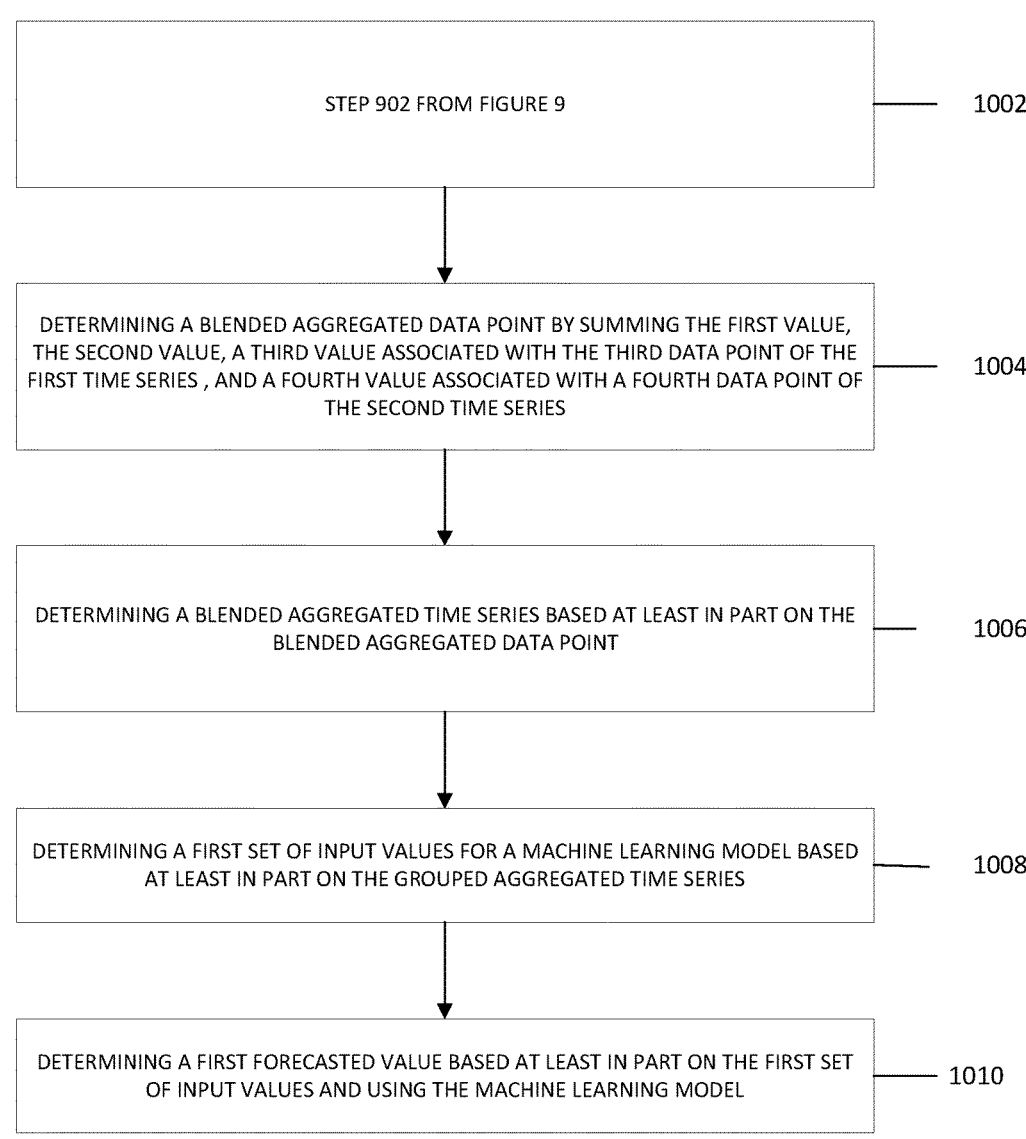

STEP 902 FROM FIGURE 9 — 1002

DETERMINING A BLENDED AGGREGATED DATA POINT BY SUMMING THE FIRST VALUE, THE SECOND VALUE, A THIRD VALUE ASSOCIATED WITH THE THIRD DATA POINT OF THE FIRST TIME SERIES , AND A FOURTH VALUE ASSOCIATED WITH A FOURTH DATA POINT OF THE SECOND TIME SERIES — 1004

DETERMINING A BLENDED AGGREGATED TIME SERIES BASED AT LEAST IN PART ON THE BLENDED AGGREGATED DATA POINT — 1006

DETERMINING A FIRST SET OF INPUT VALUES FOR A MACHINE LEARNING MODEL BASED AT LEAST IN PART ON THE GROUPED AGGREGATED TIME SERIES — 1008

DETERMINING A FIRST FORECASTED VALUE BASED AT LEAST IN PART ON THE FIRST SET OF INPUT VALUES AND USING THE MACHINE LEARNING MODEL — 1010

FIG. 10

FORECASTING DATASETS USING BLEND OF TEMPORAL AGGREGATION AND GROUPED AGGREGATION

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others. In many instances, a cloud services provider can offer on-demand services.

BRIEF SUMMARY

Embodiments described herein are directed toward forecasting datasets using blend of temporal aggregation and grouped aggregation. One embodiment includes a method for forecasting datasets using blend of temporal aggregation and grouped aggregation. The method includes a computing system receiving a first time series and a second time series, the first time series comprising a first data point associated with a first time step and a first value, the second time series comprising a second data point associated with a second time step and a second value.

The method further includes the computing system determining a grouped aggregated data point using the first time series and the second time series by the following.

The method further includes the computing system aligning the first data point and the second data point based at least in part on the first time step matching the second time step.

The method further includes the computing system determining grouped aggregated data point by summing the first value and the second value based at least in part on the alignment.

The method further includes the computing system determining a grouped aggregated time series based at least in part on the grouped aggregated data point.

The method further includes the computing system determining a first set of input values for a machine learning model based at least in part on the grouped aggregated time series.

The method further includes the computing system determining a first forecasted future value based at least in part on the first set of input values input and using the machine learning model.

Embodiments can further include a computing system, including a processor and a computer-readable medium including instructions that, when executed by the processor, can cause the processor to perform operations including receiving a first time series and a second time series, the first time series comprising a first data point associated with a first time step and a first value, the second time series comprising a second data point associated with a second time step and a second value.

The instructions that, when executed by the processor, can further cause the processor to perform operations including determining a grouped aggregated data point using the first time series and the second time series by the following.

The instructions that, when executed by the processor, can further cause the processor to perform operations including aligning the first data point and the second data point based at least in part on the first time step matching the second time step.

The instructions that, when executed by the processor, can further cause the processor to perform operations including determining grouped aggregated data point by summing the first value and the second value based at least in part on the alignment.

The instructions that, when executed by the processor, can further cause the processor to perform operations including determining a grouped aggregated time series based at least in part on the grouped aggregated data point.

The instructions that, when executed by the processor, can further cause the processor to perform operations including determining a first set of input values for a machine learning model based at least in part on the grouped aggregated time series.

The instructions that, when executed by the processor, can further cause the processor to perform operations including determining a first forecasted future value based at least in part on the first set of input values input and using the machine learning model.

Embodiments can further include a non-transitory computer-readable medium including stored thereon instructions that, when executed by a processor, causes the processor to perform operations including receiving a first time series and a second time series, the first time series comprising a first data point associated with a first time step and a first value, the second time series comprising a second data point associated with a second time step and a second value.

The instructions that, when executed by the processor, can further cause the processor to perform operations including determining a grouped aggregated data point using the first time series and the second time series by the following.

The instructions that, when executed by the processor, can further cause the processor to perform operations including aligning the first data point and the second data point based at least in part on the first time step matching the second time step.

The instructions that, when executed by the processor, can further cause the processor to perform operations including determining grouped aggregated data point by summing the first value and the second value based at least in part on the alignment.

The instructions that, when executed by the processor, can further cause the processor to perform operations including determining a grouped aggregated time series based at least in part on the grouped aggregated data point.

The instructions that, when executed by the processor, can further cause the processor to perform operations including determining a first set of input values for a machine learning model based at least in part on the grouped aggregated time series.

BRIEF DESCRIPTION OF THE DRAWINGS

FIG. 9 is a process flow for determining a forecasted value using a grouped aggregated time series, according to one or more embodiments.

FIG. 10 is a process flow for determining a forecasted value using a blended aggregated time series, according to one or more embodiments.

DETAILED DESCRIPTION

Figure 1:
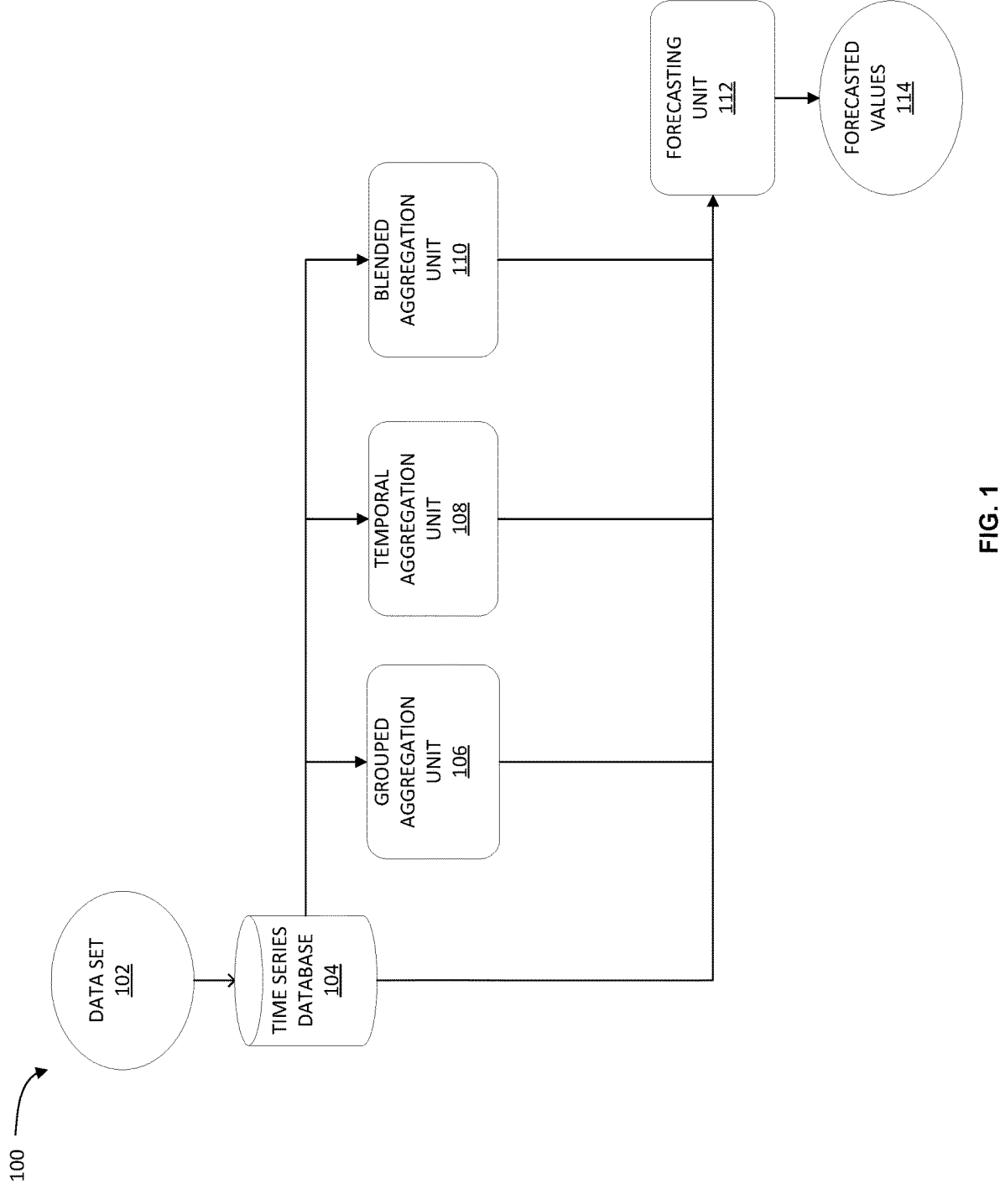
FIG. 1 is an illustration of a system for generating forecasting values, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) can offer a suite of services, such as a forecasting service for its customers. In a standard scenario, a customer can provide the CSP with multiple time series and a request for one or more forecasted values. A time series can include a series of data points indexed over time, where each data point is associated with a time step and value. A time series can be a set of data points represented as: Time Series=$\{(T1, V1), (T2, V2), (T3, V3), \ldots)\}$, where each data point, $(Ti, Vi)$, can include a time step, $T_i$, and at least one observed value $Vi$. Each data point can include one or more attributes with associated values. A data point, DP, can include at least one observed value, $V_i$, collected at the respective time step, $T_i$, and be related to a single entity. For example, the time series can include five yearly time series for daily temperatures for Seattle, WA, from 2016 to 2020. Each time step, $T_i$, can include a respective date between 2016 and 2020, each value, $V_i$, can be a temperature recorded on the respective date, and each temperature can be collected in Seattle, WA.

The CSP can use a machine learning system configured for forecasting algorithms to output the one or more forecasted values derived from time series. As indicated above, in some instances, the customer can ask the CSP to forecast multiple future values for multiple future time steps. In some instances, after the CSP forecasts a first future data point, the CSP uses the forecasted value for the first future data point to forecast a value for a second future data point. One issue that can arise is if there is an error or reduced accuracy in the forecasted value for the first future data point. This error or reduced accuracy gets carried over for the second future data point to subsequent future data points.

Embodiments of the disclosure address the above-referenced issues by providing a blended approach that uses a temporal aggregation and a grouped aggregation to manipulate the data points of one or more time series to create new time series. As described below, the embodiments described herein permit a CSP to use multiple forecasting techniques to forecast multiple future values for each requested future time step. The customer can be presented with a set of future values for each future time step with more than value to use based on the customer's own metrics.

The CSP can create grouped time series by aligning the data points of multiple time series. The CSP can then perform a mathematical operation to group the aligned data points of each of the time series to create a new time series. For example, the CSP can receive a first time series that includes thirty data points (e.g., daily rainfall from point A for a first month) and a second time series that includes thirty data points (e.g., daily rainfall from point B for the first month). The CSP can group the aligned data points by performing a mathematical operation to create new time series of thirty data points. The alignment can be based on, for example, the day of the month, and the mathematical operation can be a summing operation. For example, the data point from point A for the first day of the first month and the data point from point B for the first day of the first month can be aligned based on both being the first day of the first month. The daily rainfall from point A for the first day of the first month can be five units and the daily rainfall from point B for the first day of the first month can be six units. The respective data points for the first day of the first month can be grouped by summing the daily rainfall (e.g., 5 units+6 units=11 units). A first data point of a new grouped aggregated time series can include a daily rainfall of eleven units. The CSP can continue to group the aligned data points until it creates a new grouped aggregated time series of thirty data points. The CSP can then use the new grouped aggregated time series to forecast future values for future time steps.

The CSP can further create temporally aggregated time series by aggregating adjacent data points of a single time series. For example, the CSP can receive the first time series with thirty data points described above (e.g., rainfall for point A for a first month). The CSP can then perform a mathematical operation to aggregate pairs of adjacent data points to create a new temporally aggregated time series. The mathematical operation can be a summing operation on the values of the adjacent data points. As indicated above, the daily rainfall for point A for the first day of the first month can be five units. Furthermore, the daily rainfall for point A for the second day of the first month can be eight units. The CSP can create a temporally aggregated data point by summing the daily rainfall (e.g., 5 units+8 units=13 units). The CSP can continue to aggregate adjacent data points unit it creates a temporally aggregated time series with fifteen data points. In this example, the CSP can aggregate a pair of adjacent data points to create the temporally aggregated data points. It should be appreciated that the CSP can create additionally temporally aggregated data points by aggregating more than two adjacent data points. For example, the CSP can create another temporally aggregated time series by aggregating groups of three adjacent data points. Each of the new temporally aggregated time series can be used to forecast future values for future data points. The CSP can further forecast future values for future time steps using the temporally aggregated time series.

The CSP can further create a blended time series using a combination of grouping aligned data points and aggregating adjacent data points. The CSP can receive multiple time series and create new blended time series that include data points that are both temporally aggregated and grouped aggregated. Using the example from above, the CSP can receive a first time series that includes thirty data points (e.g., daily rainfall from point A for a first month) and a second time series that includes thirty data points (e.g., daily rainfall from point B for the first month). The daily rainfall from point A for the first day of the first month can be five units, the daily rainfall from point B for the second day of the first month can be eight units, the daily rainfall from point B for the first day of the first month can be six units, and a daily rainfall from point B for the second day of the first month can be two units. The CSP can use the data points and perform a temporal aggregation and a grouped aggregation without regard to the order as to which of the grouped or temporal aggregation is performed first or second. For example, the CSP can use a mathematical operation, such as summing, to perform temporal aggregation on the daily rainfall from point A for the first two days of the first month to reach a value of eleven units (e.g., 5 units+8 units=11 units) and temporal aggregation on the daily rainfall from point B for the first two days of the first month to reach a value of eight units (e.g., 6 units+2 units=8 units). The CSP can use a mathematical operation, such as summing, to perform a blended aggregation to reach nineteen units (e.g., 11 units+8 units=19 units). The CSP can continue to create blended aggregated data points to create a new blend aggregated time series with fifteen data points. The CSP can further forecast future values for future time steps using the blended aggregated time series.

As illustrated, the CSP can forecast future values for future time steps using the original time series, a grouped aggregated time series, a temporally aggregated time series, and a blended aggregated time series. The CSP can further provide all of the forecasted future time values to the customer, which can choose which forecasted future values best serve their interests.

FIG. 1 is an illustration 100 of a system for generating forecasting values, according to one or more embodiments. The system can be implemented by a forecasting service of a CSP. For example, the CSP can use one or more servers of the cloud computing environment to operate the forecasting service for its customers. A customer can provide a data set 102 and request for forecasted future values that are received by a time series database 104. The data set 102 can include multiple time series that are each a set of data points indexed over different time intervals. For example, the time series can include a first time series of daily rainfall in Cupertino, California for January 1996, a second time series that include daily rainfall in San Francisco, California for January 1996, and daily rainfall in Modesto, California for the January 1996. The system can transmit the time series from the time series database 104 to a grouped aggregation unit 106, a temporal aggregation unit 108, and a blended aggregation unit 110. Each of the units can use the time series to generate new time series that can be used to forecast future values for future time steps.

The grouped aggregation unit 106 can be implemented by one or more servers of a cloud computing environment for generating grouped aggregated time series to be used for forecasting future values for future time steps. The aligned sets of time series can include two or more time series. In some embodiments, the periodicity of the two or more time series can be the same (e.g., each time series is daily data, or each time series is monthly data). Using the rainfall time series example from above, the grouped aggregation unit 106 can align the first time series, second time series, and third time series; include the first time series and the second time series, the first time series and the third series; and include the second time series and the third time series. As each of the time series is monthly rainfall, the grouped aggregation unit can group together data points based on common months. The grouped aggregation unit 106 can further group together aligned data points to create new grouped aggregated time series. For example, the grouped aggregation unit 106 can group together the Jan. 1, 1996 rainfall for Cupertino, California; the Jan. 1, 1996 rainfall for San Francisco, California; and the Jan. 1, 1996 rainfall for Modesto, California to generate a new grouped aggregated datapoint. The grouped aggregation unit 106 can continue to group the respective daily rainfall for the rest of January 1996, to generate a new time series. The grouped aggregation unit 106 can create another grouped aggregated time series by only grouping together values for two years, rather than all three. For example, the grouped aggregation unit 106 can group together the January rainfall for Cupertino, California and the January rainfall for San Francisco, California to generate a new grouped aggregated datapoint. Grouped aggregated data points are discussed with more particularity with respect to FIG. 2.

The temporal aggregation unit 108 can be implemented by one or more servers of a cloud computing environment for generating temporally aggregated time series to be used for forecasting future values for future time steps. For each received time series, the temporal aggregation unit 108 can temporally aggregate two or more adjacent data points to create temporally aggregated data points. For example, the temporal aggregation unit 108 can group together the Jan. 1, 1996 rainfall in Cupertino California and the Jan. 2, 1996 rainfall in Cupertino, California to create a temporally aggregated data point. The temporal aggregation unit 108 can continue to temporally aggregate adjacent data points to generate a temporally aggregated time series. The temporal aggregation unit 108 can generate additional temporally aggregated time series using the 1996 California rainfall by aggregating more than two adjacent data points. For example, the temporal aggregation unit 108 can generate a temporally aggregated time series by aggregating three adjacent data points of the 1996 California rainfall (e.g., the Jan. 1, 1996 rainfall in Modesto, California, the Jan. 2, 1996 rainfall in Modesto, California, and the Jan. 3, 1996 rainfall in Modesto, California.) The temporal aggregation unit 108 can use the same process for generating temporally aggregated time series from each received time series. For example, the temporal aggregation unit 108 can create multiple temporally aggregated time series from the January 1996 Cupertino, California rainfall and the January 1996 San Francisco, California rainfall. The CSP can further respectively forecast future values using each of these generated temporally aggregated time series.

The blended aggregation unit 110 can be implemented by one or more servers of a cloud computing environment for generating blended aggregated time series to be used for forecasting future values for future time steps. The blended aggregation unit 110 can receive the time series from the time series database 104 and generate blended aggregated time series by grouping aligned data points and temporally aggregating adjacent data points.

The forecasting unit 112 can receive time series information from the grouped aggregation unit 106, the temporal aggregation unit 108 and the blended aggregation unit 110.

The forecasting unit 112 can further receive the original time series information from the time series database 104. The forecasting unit 112 can include a suite of forecasting techniques for generating forecasted future values. The forecasting unit 112 can further select a technique based on the extracted features. The forecasting unit 112 can further employ a model that implements the selected technique to forecasted values 114 for a future time step. The forecasting unit 112 can be configured to employ various methods for generating forecasted values 114, such as qualitative techniques, time series analysis and projection, or causal models.

Figure 2:
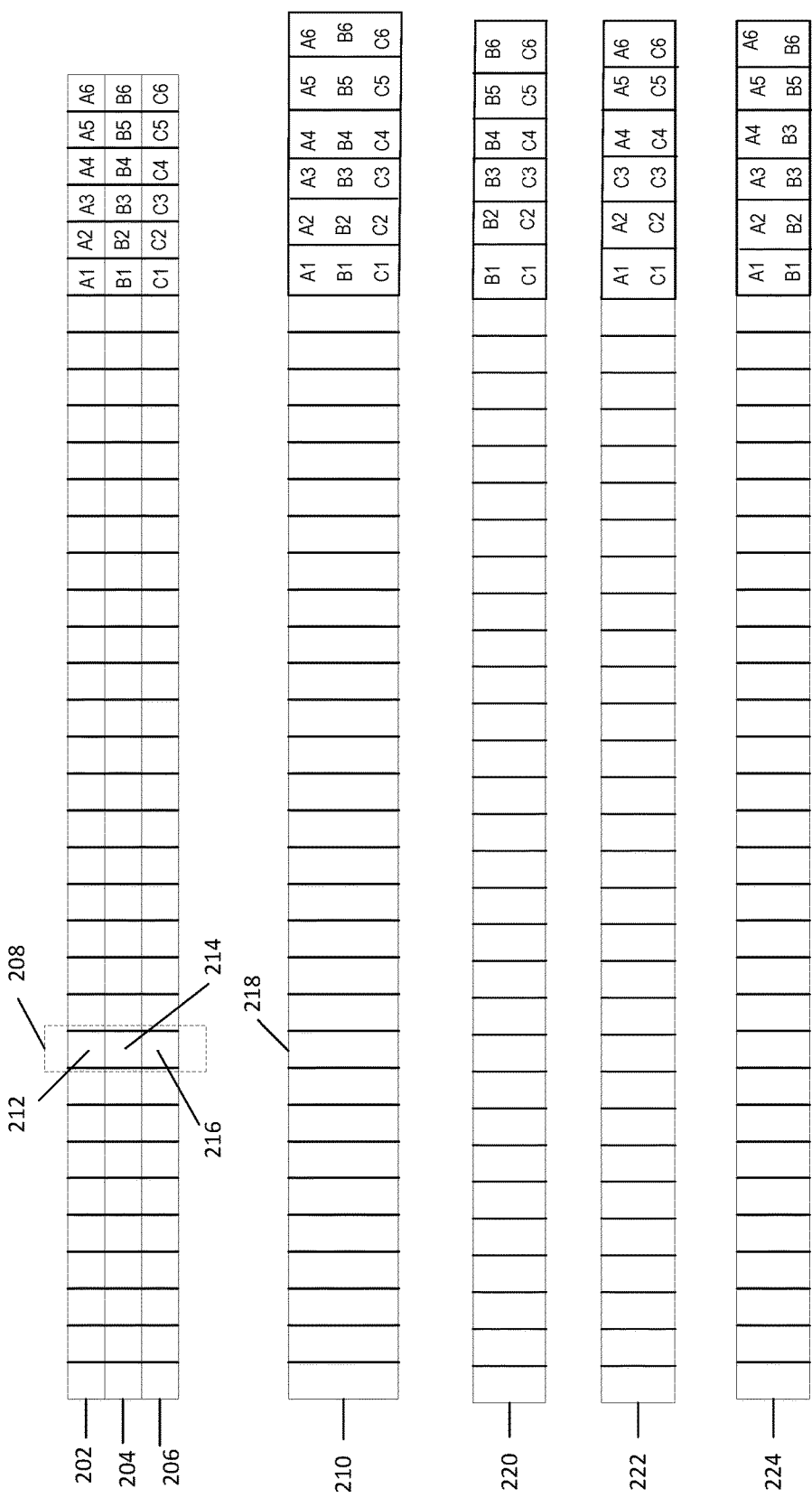
FIG. 2 is an illustration of a grouped aggregation, according to one or more embodiments.

FIG. 2 is an illustration 200 of a grouped aggregation, according to one or more embodiments. A CSP, using a forecasting service, can receive a multiple time series and request a request for forecasted values for future time steps. As illustrated, the CSP has received a first time series 202, a second time series 204, and a third time series 206 and a request for forecasting values for six future time steps. Each time series includes thirty data points that each represent a respective time step and a value. The CSP can align each of the time series based on the time steps. For example, the first time series 202 can include data points for daily coffee sales in June of 1997 for vendor A, the second time series 204 can include data points for daily coffee sales in June of 1997 for vendor B, and the third time series 206 can include data points for daily coffee sales in June of 1997 for vendor C. The time series can be aligned based on the days of the month. For example, the data point for the first day of the month for the first time series 202 is aligned with the first day of the month for the second time series 204, and the first day of the month of the third time series 206. As illustrated, the alignment is portrayed as a vertical arrangement, where aligned data points are stacked on top of each other. For example, a set of three aligned data points 208 is highlighted in a rectangle using dashed lines. Continuing with the example from above, the set of three aligned data points can include a data point for coffee sales for the tenth day of the month for each of the first, second, and third time series. It should be appreciated that the vertical stacking as a table is for illustration, and in real-world scenarios, the time series can be provided in the form of wave forms.

In addition to creating grouped aggregated time series, the CSP can use a forecasting unit to generate forecasted values using each of the time series using any desired models that implement one or more forecasting techniques (e.g., Prophet, autoregressive integrated moving average (ARIMA), exponential smoothing). As illustrated, the CSP customer has requested future value for six future time steps, and it can be said that the forecasting horizon is six, where the forecasting horizon can be a number of time steps into the future for requested forecasted values. As illustrated, the CSP has forecasted future values for six future time steps for each time series. For example, the CSP has forecasted six future values for six future time steps (e.g., data points A1, A2, A3, A4, A5, and A6) using the first time series 202, (e.g., data points B1, B2, B3, B4, B5, and B6) using the second time series 204, and six future values for six future time steps (e.g., data points C1, C2, C3, C4, C5, and C6) using the third time series 206. Each of the data points can be associated with a future time step for the last time step in each time series. For example, A1 can be a data point for forecasted daily coffee sales on Jul. 1, 1997, for vendor A2 can be a data point for forecasted daily coffee sales on Jul. 2, 1997, for vendor A, and so forth.

In addition to forecasting values using the first time series 202, the second time series 204, and the third time series 206, the CSP can create different grouped aggregated time series to forecast future values for the six requested future time steps. To create the grouped aggregated time series, the CSP (e.g., using the grouped aggregation unit 106 of FIG. 1) can perform a mathematical operation for each set of aligned data points and create grouped aggregated data points for a grouped aggregated time series. The set of aligned data points can be two or more of the time series received by the CSP for generating forecasted values. A grouped aggregated time series 210 can be created using a set of aligned data points from the first time series 202, the second time series 204, and the third time series 206. As an illustration, refer back to the set of three aligned data points 208. A first aligned data point 212 can include a value for daily coffee sales for the tenth day of June 1997 for vendor A (e.g., 25 coffees sold), a second aligned data point 214 can include daily coffee sales for the tenth day of June 1997 for vendor B (e.g., 15 coffee sales), and a third aligned data point can include daily coffee sales for the tenth day of June 1997 for vendor C (e.g., 40 coffee sales).

A grouped aggregation unit can perform a mathematical operation on the values of each of the aligned data points to create a grouped aggregated data point 218. The mathematical operation can be a summing operation on each of the values associated with the aligned data points. For example, the grouped aggregation unit can sum the values 25, 15, and 40 to reach a sum of 80 daily coffee sales. The grouped aggregation unit can further associate the time step of the tenth day of June to the grouped aggregated data point 218. The grouped aggregation unit can perform the mathematical operation for each set of three aligned data points to generate the grouped aggregated time series 210. The CSP can further use a forecasting unit (e.g., the forecasting unit 112 of FIG. 1) to extract features from the grouped aggregated time series and transmit the extracted features and grouped aggregated time series 210 to a forecasting unit (e.g., forecasting unit 112 of FIG. 1) to forecast future values for future time steps. As illustrated, the CSP customer has request forecasted values for six future time steps (e.g., a horizon of six). The forecasting unit can further use a machine learning model that can implement a forecasting technique to generate the forecasting values. The forecasted values in this instance are generated using the grouped aggregated time series 210. As illustrated, the first forecasted data point A1 B1 C1 can include a forecasted value for a first time step (e.g., forecasted daily coffee sales for vendors A, B, and C on Jul. 1, 1997), the second forecasted data point A2 B2 C2 can include daily forecasted coffee sales for vendors A, B, and C on Jul. 2, 1997, and so forth). The forecasted data points (e.g., (A1 B1 C1)-(A6 B6 C6)) are grouped aggregated forecasted values. Therefore, the forecasting unit can perform additional mathematical operations to calculate individual forecasted values using the grouped aggregated forecasted values. These additional mathematical operations are described in more particularity with respect to FIG. 3.

It should be appreciated that the additional mathematical operation can result in an additional forecasted value for each requested future time step. As described above, using the first time series 202, the forecasting unit can forecast a first set of forecasted data points A1-A6. Using the grouped aggregated time series, the forecasting unit can forecast a second of forecasted data points A1-A6 for the same set of time steps as the first set of forecasted data points. For example, the forecasted data point A1 can include a first forecasted daily coffee sales for vendor A on Jul. 1, 1997, generated using the first time series 202. The forecasted data point A1 can include a second daily coffee sales for vendor A on Jul. 1, 1997, generated using the grouped aggregated time series 210. The CSP customer can receive multiple forecasted values for each requested future time step using grouped aggregated time series and a time series that has not been grouped aggregated.

The grouped aggregation unit can create additional grouped aggregated time series using different combinations of received time series. The additional group aggregated time series can include subsets of time series used to create the grouped aggregated time series 210. For example, the grouped aggregated time series 210 is generated using three received time series (e.g., the first time series 202, the second time series 204, and the third time series 206). The grouped aggregation unit can also create a second grouped aggregated time series 220, a third grouped aggregated time series 222, and a fourth grouped aggregated time series 224 using two time series each.

The grouped aggregation unit can generate the second grouped aggregated time series 220 by performing a mathematical operation to aggregate the aligned data points of the second time series 204 and the third time series 206. The grouped aggregation unit can transmit the second grouped aggregated time series 220 to a forecasting unit to forecast future values for future time steps. As illustrated, the forecasting unit can forecast six future grouped aggregated data points (e.g., (B1 C1)-(B6 C6)) using the second grouped aggregated time series 220. The forecasting unit can perform additional mathematical operation to determine individual forecasted values for each of the future time steps. For example, the forecasting unit can forecast data points B1-B6 and C1-C6 using the second time series 204 and the third time series 206, respectively. The forecasting unit can further forecast data points A1-A6, B1-B6, and C1-C6 using the grouped aggregated time series 210. The forecasting unit can further forecast data points B1-B6 and C1-C6 using the second grouped aggregated time series 220. The forecasting unit can perform similar operations to forecast values for using the third grouped aggregated time series 222 and the fourth grouped aggregated time series 224.

Therefore, by creating the multiple grouped aggregated time series, the CSP can offer multiple values for each requested future time step. This can be advantageous in instances, in which the forecasting unit can more readily detect features or detect new features using the grouped aggregated time series as opposed to the non-grouped aggregated time series. In certain situations, based on the data and the selected forecasting techniques, the new and additional features can lead to a more accurate forecasted value for a future time step than without the new or additional features.

Figure 3:
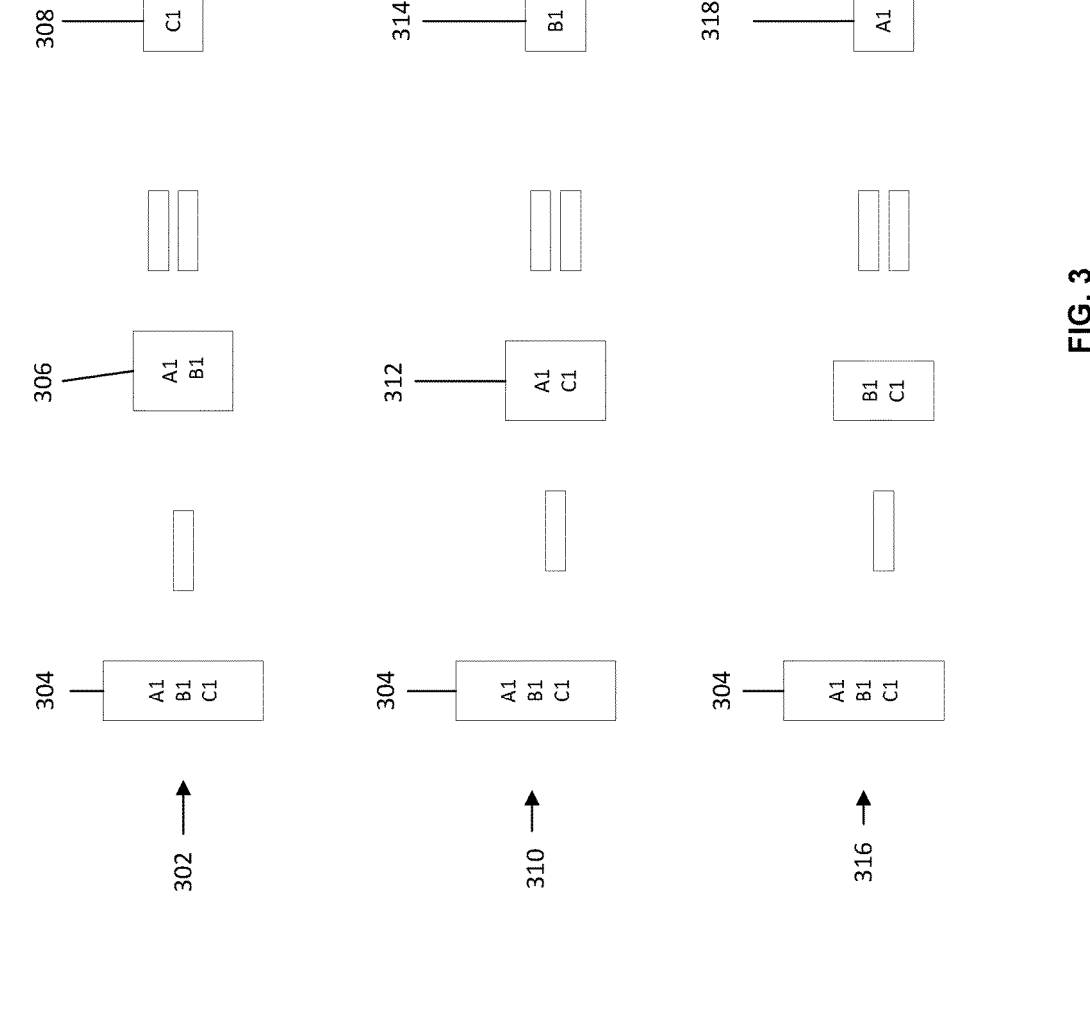
FIG. 3 is an illustration of a mathematical operation for determining forecasted values, according to one or more embodiments.

FIG. 3 is an illustration of a mathematical operation for determining forecasted values, according to one or more embodiments. The CSP can use a forecasting unit (e.g., forecasting unit 112 of FIG. 1) to forecast values for requested future data points using grouped aggregated time series. As described above, the forecasting unit can forecast grouped aggregated values using grouped aggregated time series. The forecasting unit can further perform additional mathematical operations to determine individual forecasted values. The grouped aggregated forecasted values can include sums of individual forecasted values. Therefore, the forecasting unit can perform additional operations, such as subtractions, to determine individual forecasted values. FIG. 3 includes an illustration of a first equation 302. As seen, the forecasting unit can forecast a first grouped aggregated data point, A1 B1 C1 304 (e.g., forecasted using the grouped aggregated time series 210 of FIG. 2). The first grouped aggregated data point 304 includes a grouped aggregated value for the individual values of data points A1, B1, and C1.

The forecasting unit can further perform additional mathematical operation to determine the individual values for data points A1, B1, and C1. As seen, the forecasting unit can further determine a second grouped aggregated data point, A1 B1 306 that includes a grouped aggregated value. The second grouped aggregated data point 306 includes a grouped aggregated value for the individual values of data points A1 and B1. The forecasting unit can subtract the value of the second grouped aggregated data point 306 from the value of the first grouped aggregated data point 304 to reach the value for the first data point, C1, 308 that includes the value for the data point 308. As the first grouped aggregated data point 304 and the second grouped aggregated data point 306 are for a same future time step, the data point 301 includes the same time step.

The forecasting unit can perform similar mathematical operations to reach the values for data points B1 and C1. As illustrated, the forecasting can perform the second equation 310 the forecasting unit can determine a third grouped aggregated data point, A1 C1, 312. The forecasting unit can further subtract the value of the third grouped aggregated data point 312 from the value of the first grouped aggregated data point 304 to reach a value for the second data point, B1, 314. The time step for the first grouped aggregated data point 304 is the same time step as the third grouped aggregated data point 312. Therefore, the forecasting unit can assign the same time step to the second data point 314.

The forecasting unit can execute a third equation 316 with similar mathematical operations to reach a value for a third data point, A1, 318. It should be appreciated that the A1, B1, and C1 calculated using the first equation 302, the second equation 310, and the third equation 316 can be different than the data points A1, B1, and C1 that were forecasted using the first time series 202, second time series 204, and third time series 206. The CSP can transmit each of the data points to the customer, and the customer can elect to use one or more of the data points.

Figure 4:
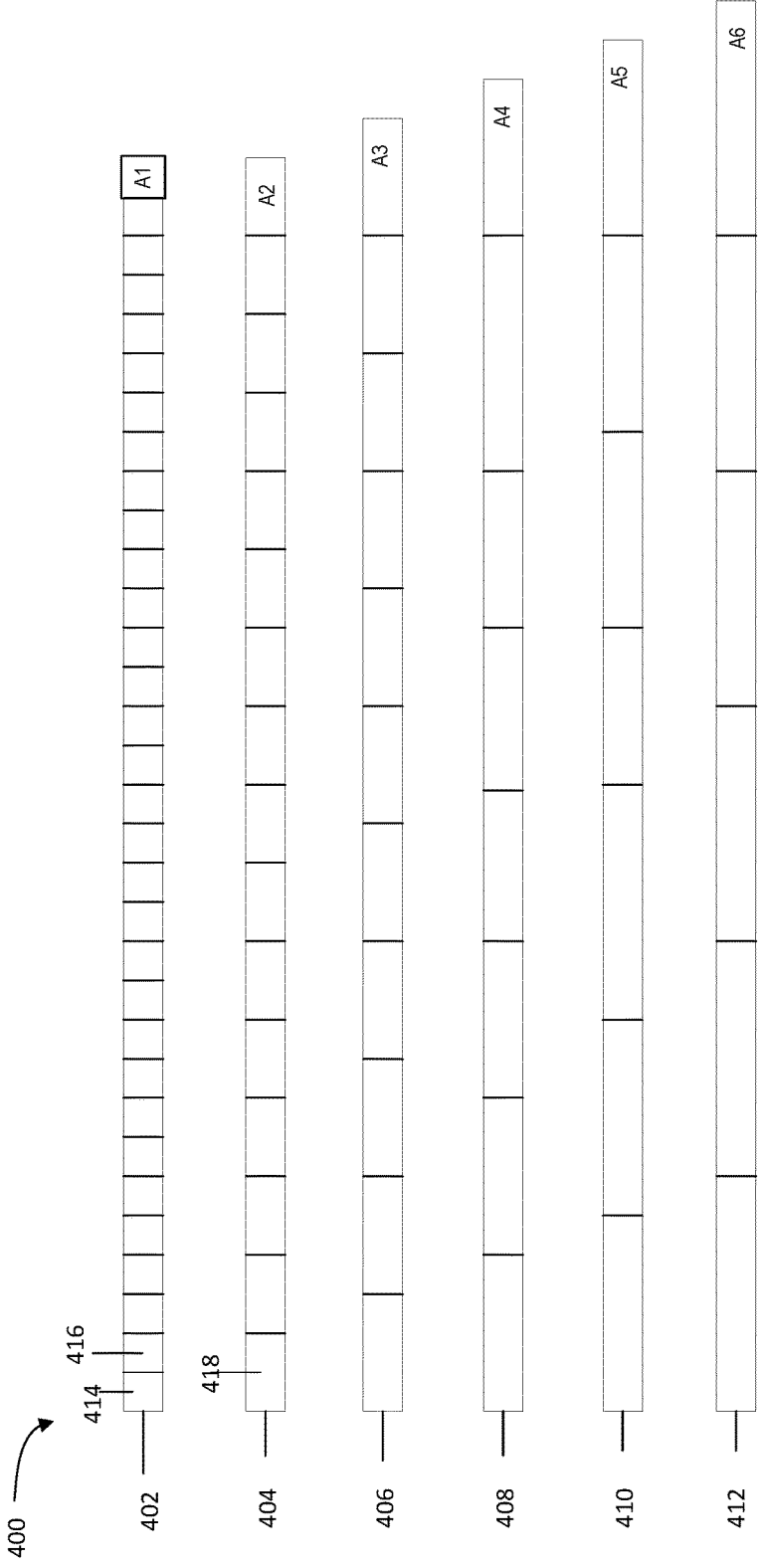
FIG. 4 is an illustration of temporal aggregation, according to one or more embodiments.

FIG. 4 is an illustration 400 of temporal aggregation, according to one or more embodiments. The CSP can use a temporal aggregation unit (e.g., temporal aggregation unit 108 of FIG. 1) to temporally aggregate data points to generate temporally aggregated time series. It should be appreciated that whereas the grouped aggregated time series can be generated using aligned data points of different time series, the temporally aggregated time series can be created by using adjacent data points of the same time series.

The temporal aggregation unit can receive a first time series 402 from a time series database and control instructions to create temporally aggregated time series. In some instances, the first time series 402 can be the same first time series 202 of FIG. 2. In other instances, the first time series 402 can be a different time series than the first time series 202 of FIG. 2. The first time series can include any number of data points. As illustrated, the first time series 402 includes thirty data points. The temporal aggregation unit can create an n-number of temporally aggregated time series, such that the total number of time series, including the first time series 402 equals the number of requested forecasted values. For example, if the requested number of forecasted values is six (e.g., forecasted data points 1, 2, 3, 4, 5, and 6), the temporal aggregation unit can create five temporally aggregated time series. In addition, the temporal aggregation unit can further transmit the first time series 402 to a forecasting unit to forecast the data point A1.

The temporal aggregation unit can create each temporally aggregated time series by aggregating adjacent data points from the first time series 402. The number of adjacent data points that are aggregated can correspond to the number of time steps into the future for the forecasted data point. For example, if a forecasted data point is for two time steps into the future, the temporal aggregation unit can aggregate two adjacent data points. If, however, the forecasted data point is for three time steps into the future, the temporal aggregation unit can aggregate three adjacent data points. The time step associated with a temporally aggregated data point can be the same as the youngest time step of the temporally aggregated adjacent data points.

As illustrated, the temporal aggregation unit can create a first temporally aggregated time series 404, a second temporally aggregated time series 406, a third temporally aggregated time series 408, a fourth temporally aggregated time series 410, and a fifth temporally aggregated time series 412. For each temporally aggregated time series, the temporal aggregation unit can select a number of adjacent data points to aggregate based on a number of time steps in the future that the series is to be used to forecast. If the temporally aggregated time series is to be used to forecast a data point m time steps into the future, the temporal aggregation unit can aggregate m number of adjacent data points.

Using the illustrated time series in FIG. 4, consider a scenario in which the customer has provided the first time series 402 and requested forecasted values for six time steps into the future. Returning to the daily coffee sales example, the first time series can represent daily coffee sales in June of 1997 for vendor A, and A1 can be a first temporally aggregated forecasted data point for daily coffee sales on Jul. 1, 1997, for vendor A. To create a temporally aggregated time series for forecasting a second temporally aggregated forecasted data point, A2, the temporal aggregation unit can aggregate two adjacent data points. The temporal aggregation unit can aggregate pairs of adjacent data points to generate the first temporally aggregated time series 404. For example, the temporal aggregation unit can aggregate a first data point 414 for Jun. 1, 1997, and a second data point 416 for Jun. 2, 1997. The daily coffee sales on Jun. 1, 1997, for vendor A can be twenty-two units and the daily coffee sales on Jun. 2, 1997, for vendor A can be eight units. The temporal aggregation unit can aggregate the data points to create a first temporally aggregated data point 418. To aggregate the data points, the temporal aggregation unit can sum the value of the first data point 414 (e.g., twenty-two units) with the value of the second data point 416 (eight units) to reach the value of the first temporally aggregated data point 418 (e.g., 22 units+8 units=30 units). The time step for the first temporally aggregated data point 418 can be the youngest time step of the temporally aggregated adjacent data points. In this instance, the Jun. 2, 1997 data point is younger than the Jun. 1, 1997 data point, and therefore the first temporally aggregated data point 418 can be associated with a time step of Jun. 2, 1997. The temporal aggregation unit can continue to aggregate adjacent pairs of data points from the first time series 402 to generate the first temporally aggregated time series 404. The temporal aggregation unit can continue to create temporally aggregated time series by aggregating additional adjacent data points from the first time series 402. For example, the second temporally aggregated time series 406 can include temporally aggregated data points that are created from three adjacent data points from the first time series 402.

The forecasted temporally aggregated data points A2-A6 are forecasted using temporally aggregated time series. Therefore, the forecasting unit can perform additional mathematical operations to determine the individual forecasted data points (e.g., 1, 2, 3, 4, 5, and 6). The data point A1 is generated using the first time series, which is not temporally aggregated, and therefore no additional mathematical operations are required (e.g., A1=1 unit). These mathematical operations for A2-A6 are described in particular with respect to FIG. 5. The CSP can send forecasted values generated using only the first time series 402 and the first time series along with the temporally aggregated time series to the customer.

Figure 5:
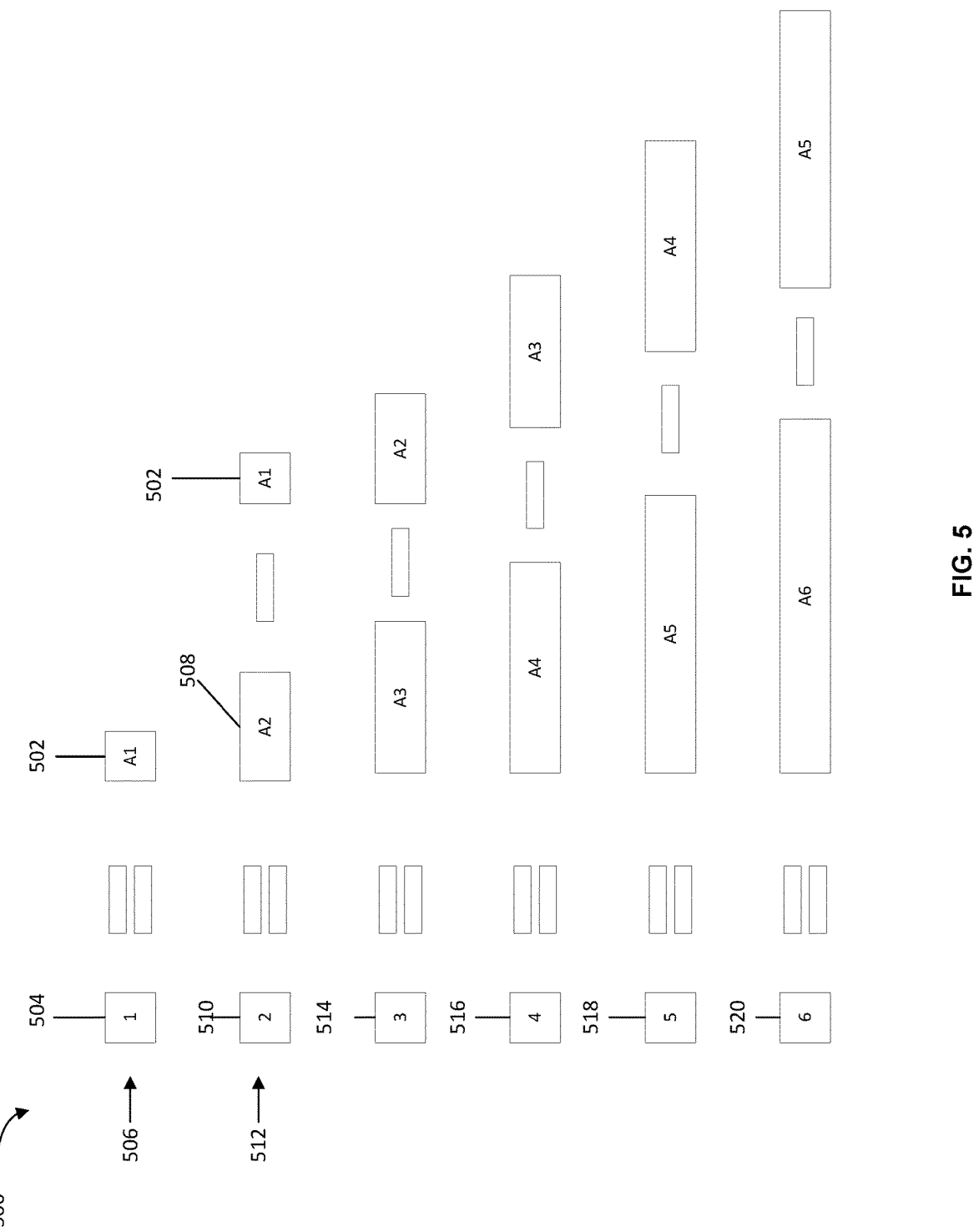
FIG. 5 is an illustration of determining data points from temporally aggregated time series, according to one or more embodiments.

FIG. 5 is an illustration 500 of determining data points from temporally aggregated time series, according to one or more embodiments. As indicated above, the forecasted data point A1 is generated using a first time series that is not temporally aggregated. Therefore, the time step and value of the forecasted data point A1 502 can be equal to the first forecasted data point 1 504, as seen in the first equation 506. Continuing with the example from above, the first forecasted data point 1 504 can be the daily coffee sales on Jul. 1, 1997, for vendor A. The forecasting unit can generate a first temporally aggregated value, A2, 508 using a temporally aggregated time series. The first temporally aggregated value, A2, 508 can include a value that combines the first forecasted data point 1 504 and a second forecasted data point, 2, 510. The second forecasted data point, 2, 510 can include a value for a subsequent time step from the time step of the first forecasted data point 1 504. For example, the second forecasted data point, 2, 510 can include a value for daily coffee sales on Jul. 2, 1997, for vendor A.

To reach the second forecasted data point, 2, 506, the forecasting unit can perform a mathematical operation, such as subtracting the first temporally aggregated forecasted value A2, 508 from the first forecasted value, A1, 502. For example, the forecasting unit can perform an operation as illustrated by the second equation 512. As an illustration, the forecasted daily coffee sales on Jul. 1, 1997, for vendor A can be 35 units and the first temporally aggregated forecasted value, A2, 508 can be 72 units. The forecasting unit can subtract the forecasted daily coffee sales on Jul. 1, 1997, for vendor A from the first temporally aggregated forecasted value, A2, 508 to reach 37 units (e.g., 72 units-35 units=37 units). Therefore, the value of the second forecasted data point, 2, 510 can be 37 units. The forecasting unit can perform similar operations to determine the values for subsequent forecasted data points. FIG. 5 provides illustrations for equations for determining a third forecasted data point 514, a fourth forecasted data point 516, a fifth forecasted data point 518, and a sixth forecasted data point 520.

Figure 6:
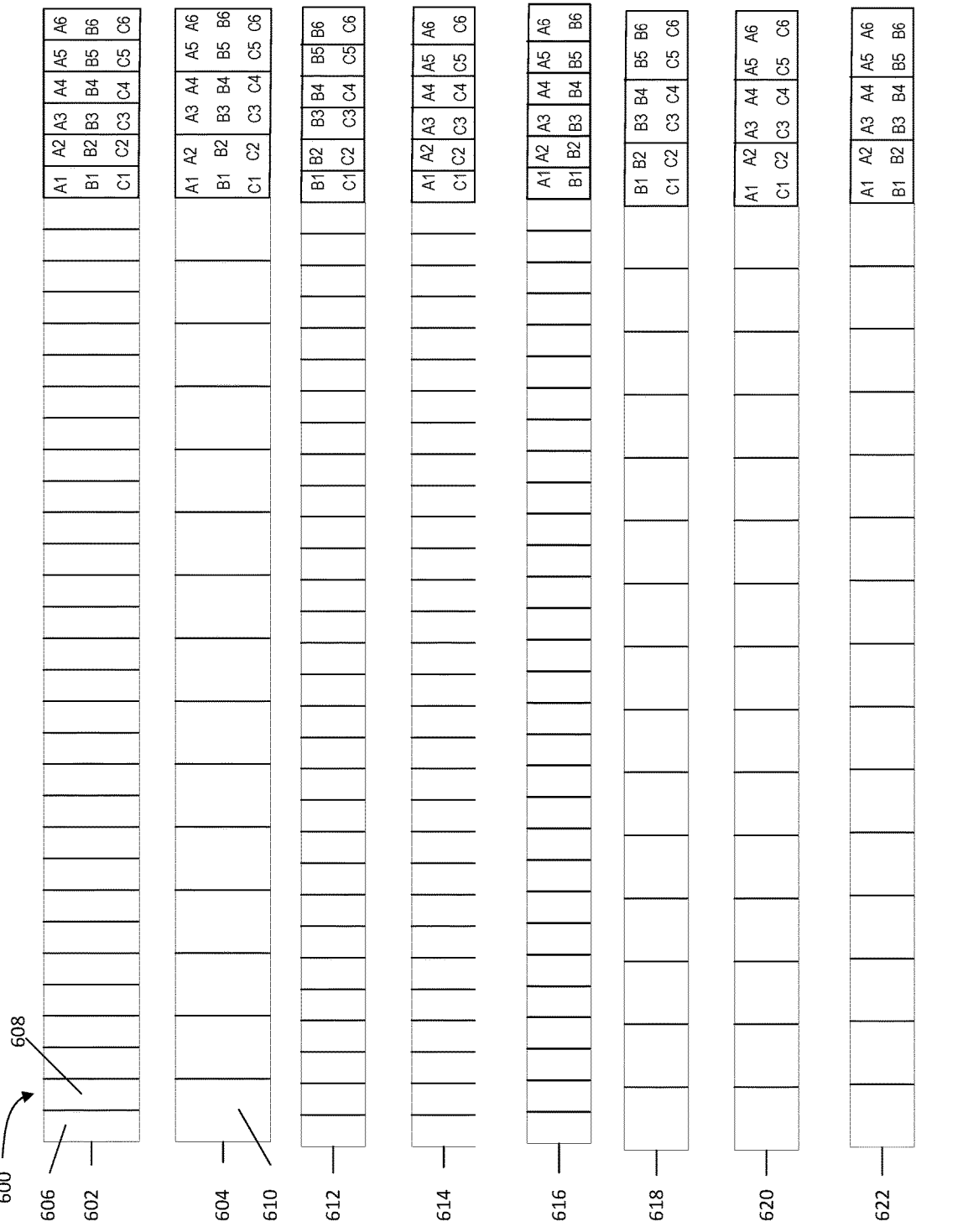
FIG. 6 is an illustration of blended aggregation, according to one or more embodiments.

FIG. 6 is an illustration of blended aggregation, according to one or more embodiments. Blended aggregation can be a combination of grouped aggregation and temporal aggregation. A blended aggregation unit (e.g., the blended aggregation unit 110 of FIG. 1) can receive multiple time series and create a grouped aggregated time series 602. The process for creating the grouped aggregated time series can be as described with respect to FIG. 2. The blended aggregation unit can further transmit the grouped aggregated time series to a forecasting unit for forecasting future grouped aggregated data points (e.g., (A1 B1 C1)-(A6 B6 C6)). The forecasting unit can further determine individual data points as described with respect to FIG. 3.

The blended aggregation unit can further temporally aggregate the adjacent data points. The blended aggregation unit can create an x number of blended aggregated time series, such that the total number of time series equals the number of requested forecasted values. For example, if the requested number of forecasted values is six, blended aggregation unit can create six blended aggregated time series. The number of adjacent blended grouped aggregated data points that are temporally aggregated can correspond to the number of time steps into the future for the forecasted data point.

As illustrated, the blended aggregation unit can create a first blended aggregated time series 604. For example, the blended aggregation unit can receive the first time series 202, the second time series 204, and the third time series 206, which can be aligned and grouped to generate the grouped aggregated time series 602. Each data point of the first blended aggregated time can be an aggregation of two adjacent data points from the grouped aggregated time series 602. For example, a first grouped aggregated data point 606 can be aggregated with a second grouped aggregated data point 608 to create a first blended aggregated data point 610. For example, the first grouped aggregated data point 606 can include values for daily coffee sales on Jun. 1, 1997, for vendor A, vendor B, and vendor C. The second grouped aggregated data point 608 can include values for daily coffee sales on Jun. 2, 1997, for vendor A, vendor B, and vendor C. The first blended aggregated data point 610 can include values for daily coffee sales on Jun. 1, 1997, and Jun. 2, 1997, for vendors A, Vendor B, and Vendor C. The values can be generated by performing a mathematical operation of the daily coffee sales on each of the days for each of the vendors. For example, if the total coffee sales for vendor A, vendor B, and vendor C on Jun. 1, 1997, was 120 units and the total coffee sales for vendor A, vendor B, and vendor C for Jun. 2, 1997, was 140 units, the value for the first blended aggregated data point can be 260 units (e.g., 120 units+140 units=260 units). Even though the data includes values for both Jun. 1, 1997, and Jun. 2, 1997, the time step included in the first blended aggregated data point 610 can be the youngest time step of the first grouped aggregated data point 606 and the second grouped aggregated data point 608, which is Jun. 2, 1997 (e.g., a Jun. 2, 1997 data point is younger than a Jun. 1, 1997 data point). The blended aggregation unit can continue to make similar calculations to create the balance of the blended aggregated data points for the first blended aggregated time series 604.

The blended aggregation unit can create additional blended aggregated time series using the received time series. For example, the blended aggregation unit can generate grouped aggregated time series using a subset of the received time series. As illustrated, the blended aggregation unit has generated a second grouped aggregated time series 612 using the second time series 204 of FIG. 2 and the third time series 206 of FIG. 2. The blended aggregation unit has created a third grouped aggregated time series 614 using the first time series 202 of FIG. 2 and the third time series 206 of FIG. 2. The blended aggregation unit has created a fourth grouped aggregated time series 616 using the first time series 202 of FIG. 2 and the second time series 204 of FIG. 2.

The blended aggregation unit can further temporally aggregate the adjacent grouped aggregated data points to generate blended aggregated data points that form blended aggregated time series. As illustrated, the blended aggregated unit can generate a second blended aggregated time series 618 by aggregating adjacent data points of the second grouped aggregated time series. The blended aggregation unit can generate a third blended aggregated time series 620 by aggregating adjacent data points of the third grouped aggregated time series 614. The blended aggregation unit can further generate a fourth blended aggregated time series 622 by aggregating adjacent data points of the fourth grouped aggregated time series 616.

The blended aggregation unit can further transmit the blended aggregated time series to a forecasting unit to forecast values for future time steps using the blended aggregated time series. Techniques for determining individual forecasting data points are described in more particularly with respect to FIGS. 7 and 8.

Figure 7:
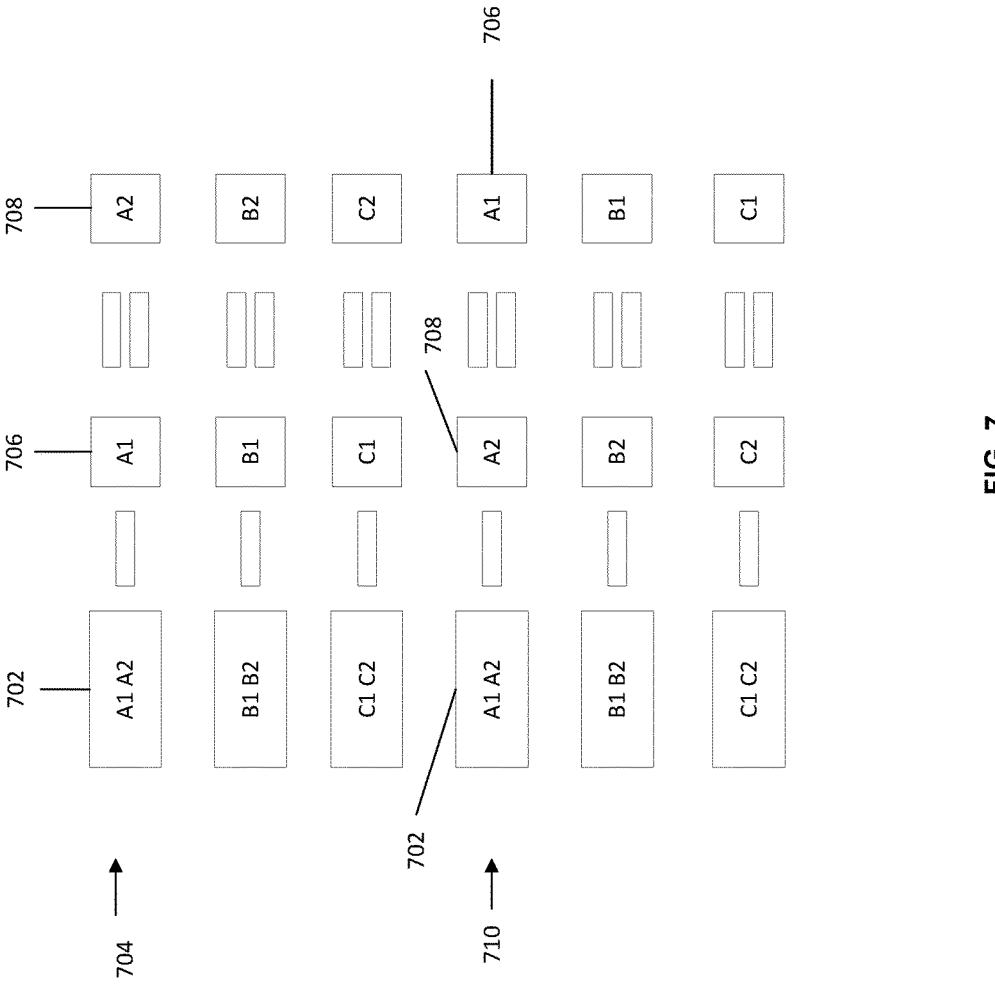
FIG. 7 is an illustration of determining data points from blended aggregated time series, according to one or more embodiments.

FIG. 7 is an illustration 700 of determining data points from blended aggregated time series, according to one or more embodiments. FIG. 7 shows various combinations of temporally aggregated data points and mathematical operations to determine individual data points. For example, a first temporally aggregated data point 702 can include a temporally aggregated value and a time step that can be used to determine an individual data point using a first equation 704. The temporally aggregated value can be a summation of two values. As illustrated, the value can be a summation of a first a first data point, A1, 706 and a second data point, A2, 708. Using the first equation 704, the forecasting unit can subtract the first data point 706 from the first temporally aggregated data point 702 to reach the second data point. The first data point 706 can include a value of five and the second data point 708 can include a value of twelve. As indicated above, the first temporally aggregated data point 702 can be a summation of the two data points, and therefore include a value of seventeen (e.g., 5+12=17). Therefore, by subtracting the first data point 706 from the first temporally aggregated data point, the forecasting unit can reach the second data point 708, including the value of twelve.

As illustrated, the forecasting unit can use a second equation 710 to determine the first data point 706 from the first temporally aggregated data point 702. In this instance, the forecasting unit can subtract the second data point 708 from the first temporally aggregated data point 702 to reach the first data point 706. Using the values from above, the forecasting unit can subtract the second data point 708 from the first temporally aggregated data point, the forecasting unit can reach the first data point 706, including the value of five (e.g., 17−12=5).

Figure 8:
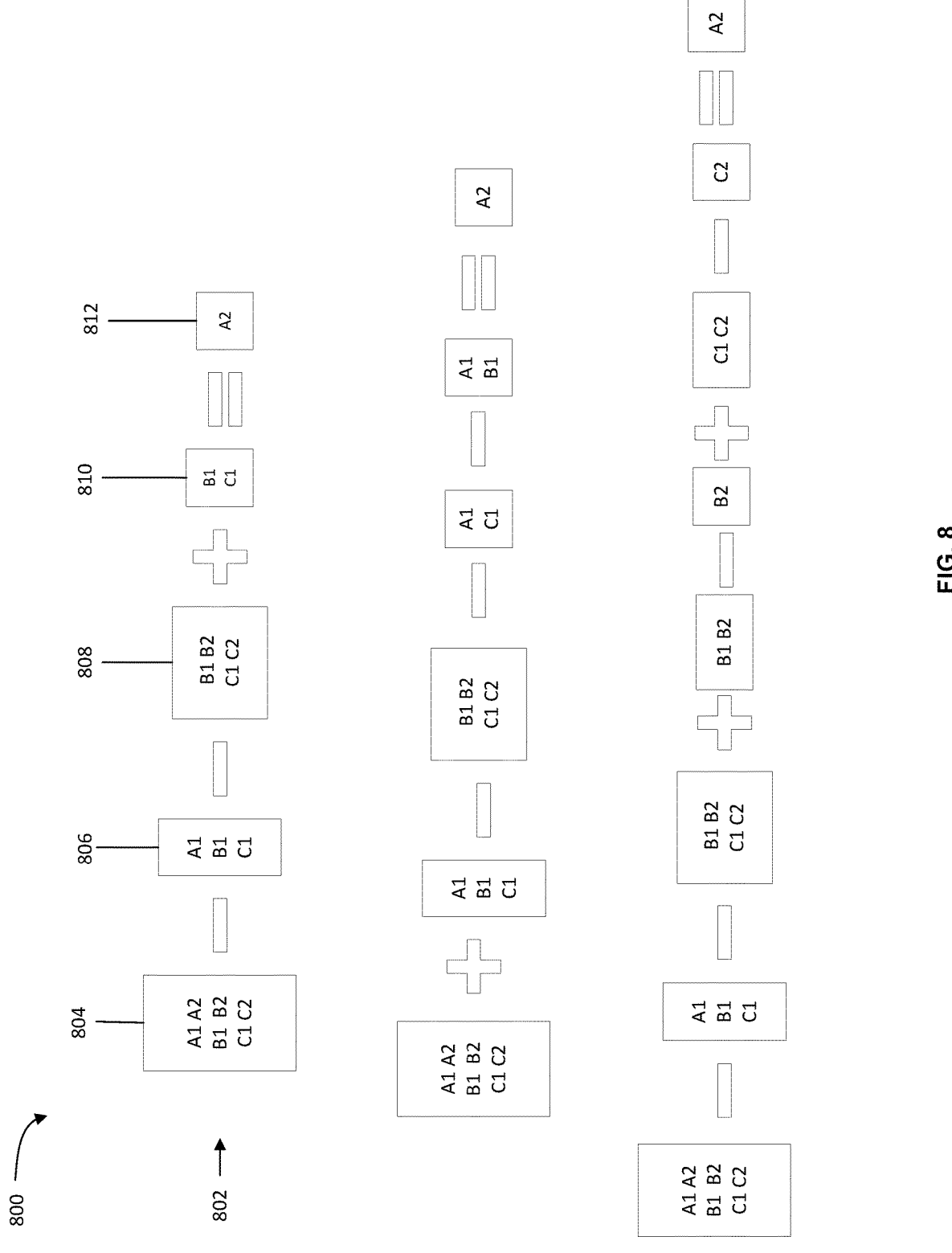
FIG. 8 is an illustration of determining data points from blended aggregated time series, according to one or more embodiments.

FIG. 8 is an illustration 800 of determining data points from blended aggregated time series, according to one or more embodiments. The forecasting unit can use various mathematical operations to determine the same individual data point. Three equations are illustrated that can each be used by the forecasting unit to reach the same data point. It should be appreciated that these three equations are not an exhaustive list of equations and the forecasting unit can be configured to use equations that are not illustrated to reach the data point.

The forecasting unit can perform a series of mathematical operations to reach individual data points. The mathematical operations can include summation, subtraction, and combinations thereof. As an example, consider a first equation 802 for determining an individual data point. The forecasting unit can receive a first blended aggregated data point 804 that includes a sum of values for data points A1, A2, B1, B2, C1, and C2. The forecasting can select an individual data point to determine. As illustrated, the forecasting unit has selected to determine the data point A2. It should be appreciated that the forecasting unit can any of the individual data points A1, A2, B1, B2, C1, and C2; and A2 has been selected for illustration purposes. The forecasting unit can further receive a first grouped aggregated data point 806 that includes a sum of the values of data points A1, B1, and C1 and subtract the value from the first blended aggregated data point 804. The forecasting unit can further receive a second blended aggregated data point 808 that includes a sum of the values of data points B1, B2, C1, and C2. The forecasting unit can further perform an additional subtraction operation to so subtract the value of the second blended aggregated data point 808 from the first blended aggregated data point 804. The forecasting unit can further receive a second grouped aggregated data point 810 that includes a sum of the values for data points B1 and C1. The forecasting unit can further perform a summing operation and sum the value of the second grouped aggregated data point 810 with the value of the first blended aggregated data point 804. The result of the calculations can be an individual data point, A2, 812, include a value and a time step.

FIG. 8 illustrates two additional equations that the forecasting unit can use to reach the data point, A2. It should be appreciated that this is not an exhaustive list of equations and one having ordinary skill in the art can contemplate additional equations to reach the data point, A2. Similar equations and calculations can be used to reach the other individual data points A1, B1, B2, C1, and C2.

FIG. 9 illustrates a process 900 for determining a forecasted value using grouped aggregated data, according to some embodiments is shown. While the operations of processes 900 and 1000 are described as being performed by generic computers, it should be understood that any suitable device (e.g., a user device, a server device) may be used to perform one or more operations of these processes. Processes 900 and 1000 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which operations are described is not intended to be construed as a limitation, and any number of the described operations can be combined in any order and/or in parallel to implement the processes.

At step 902, a method can include a computing system accessing a first time series and a second time series, the first time series including a first data point associated with a first time step and a first value, the second time series including a second data point associated with a second time step and a second value. Each time series can be provided by a customer of a CSP and also include a request for forecasted future data points. The computing system can include one or more servers of a forecasting service implemented by a cloud computing infrastructure.

At step 904, the method can include the computing system determining a grouped aggregated data point using the first time series and the second time series by following steps 906 and 908.

At step 906, the method can include the computing system aligning the first data point and the second data point based at least in part on the first time step matching the second time step. Each data point of each time series can be associated with a time step (e.g., Mar. 1, 2007, Mar. 8, 2008, . . . ). The data points of the first time series can be aligned with the data points of the second time series based on the time steps. For example, the first time series can include a first data point with a value collected on Mar. 1, 2007, and the second time series can also include a data point with a value collected on Mar. 1, 2007. Each data point of the first time series can include a data point that includes a time step that matches a time point of a data point of the second time series.

At step 908, the method can include the computing system determining the grouped aggregated data point by summing the first value and the second value based at least in part on the alignment. The computing system can sum the values of the aligned data points. For example, if a data point associated with Mar. 7, 2007, of the first time series has a value 150 and the data point associated with Mar. 7, 2007, of the second time series has a value of 50, the sum can be 200 (e.g., 150+50=200). The time step associated with the grouped aggregated data point can be the same as the time series data points (e.g., Mar. 7, 2007).

At step 910, the method can include the computing system determining a grouped aggregated time series based at least in part on the grouped aggregated data point. The computing system can follow steps 906 and 908 for each of the aligned data points of the first time series and the second time series to create grouped aggregated data points. The grouped aggregated time series can include each of the determined grouped aggregated data points.

At step 912, the method can include the computing system determining a first set of input values for a machine learning model based at least in part on the grouped aggregated time series. The first set of input values can be configured to be amenable to a selected forecasting technique (e.g., Prophet, autoregressive integrated moving average (ARIMA), exponential smoothing). The first set of input values can include, for example, a trend, a seasonality, an autocorrelation, a nonlinearity, or a heterogeneity of the grouped aggregated time series.

At step 914, the method can include the computing system determining a first forecasted future value based at least in part on the first set of input values input and using the machine learning model. The first forecasted value can be a first grouped aggregated forecasted value. The computing system can determine a first final forecasted value using one or more mathematical operations. For example, the computing system can determine the final forecasted value using the mathematical operations described by FIG. 3.

FIG. 10 is a process flow for determining a forecasted value using a blended aggregated time series, according to one or more embodiments. As described above, the herein embodiments include techniques for generating a grouped aggregated time series and a blended aggregated time series for forecasting. At step 1002, a method can flow from step 902 of FIG. 9, where the first time series further includes a third data point associated with a third time step and a third value, the third data point is adjacent to the first data point, wherein the first time series further includes a fourth data point associated with a fourth time step and a fourth value, the third data point is adjacent to the second data point.

At step 1004, the method can include the computing system determining a blended aggregated data point by summing the first value, the second value, a third value associated with the third data point, and a fourth value associated with the fourth data point.

At step 1006, the method can include the computing system determining a blended aggregated time series based at least in part on the blended aggregated data point. The computing system can follow step 1004 for each of the aligned and adjacent data points of the first time series and the second time series to create blended aggregated data points. The blended aggregated time series can include each of the determined blended aggregated data points.

At step 1008, the method can include the computing system determining a second set of input values for a machine learning model based at least in part on the blended aggregated time series. The second set of input values can be configured to be amenable to a selected forecasting technique (e.g., Prophet, autoregressive integrated moving average (ARIMA), exponential smoothing). The second set of input values can include, for example, a trend, a seasonality, an autocorrelation, a nonlinearity, or a heterogeneity of the grouped aggregated time series.

At step 1010, the method can include the computing system determining a second forecasted future value based at least in part on the second set of input values and using the machine learning model. The second forecasted value can be a first blended aggregated forecasted value. The computing system can determine a second final forecasted value using one or more mathematical operations. For example, the computing system can determine the final forecasted value using the mathematical operations described by FIG. 8.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
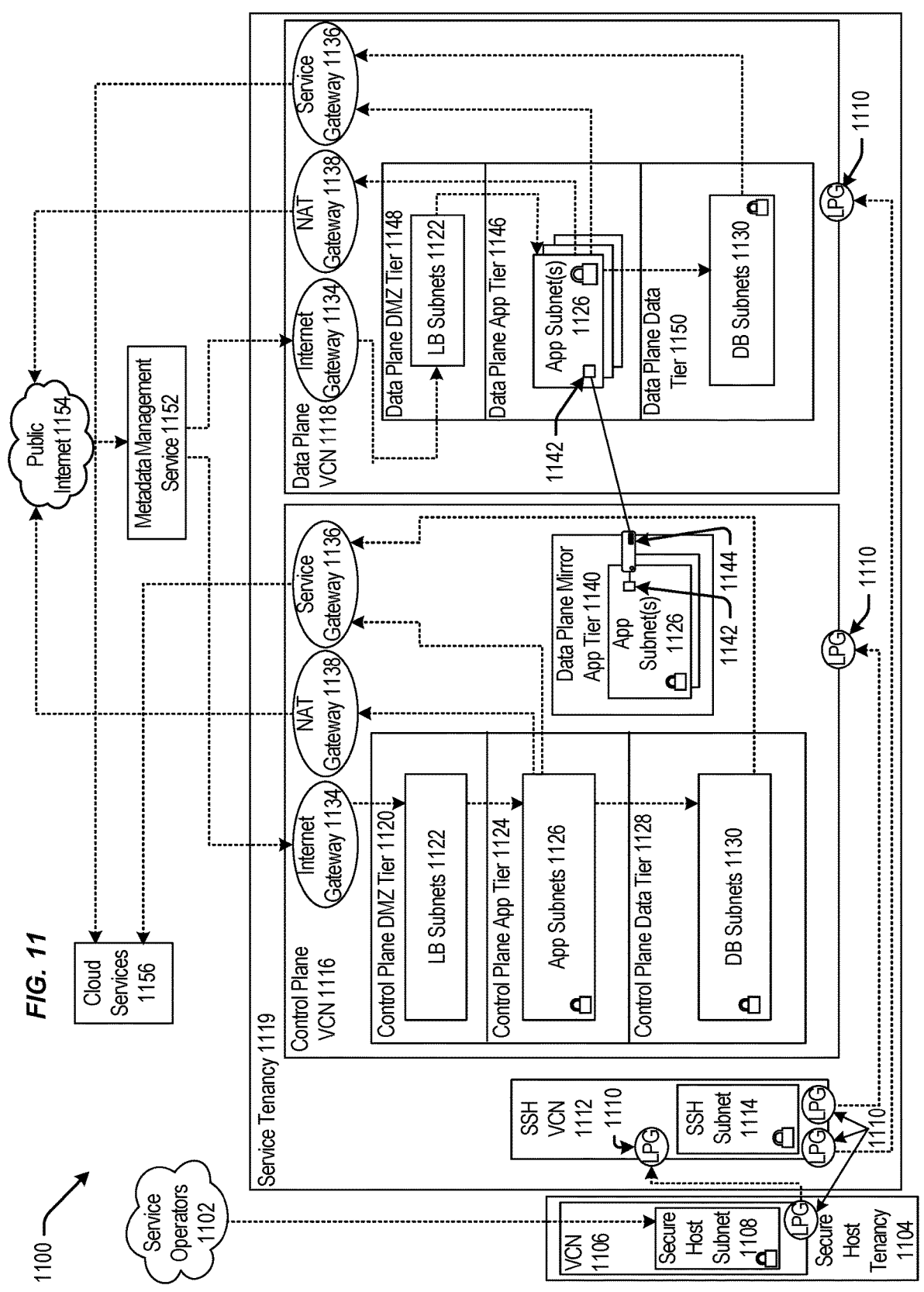
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Metadata that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of threat prevention, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
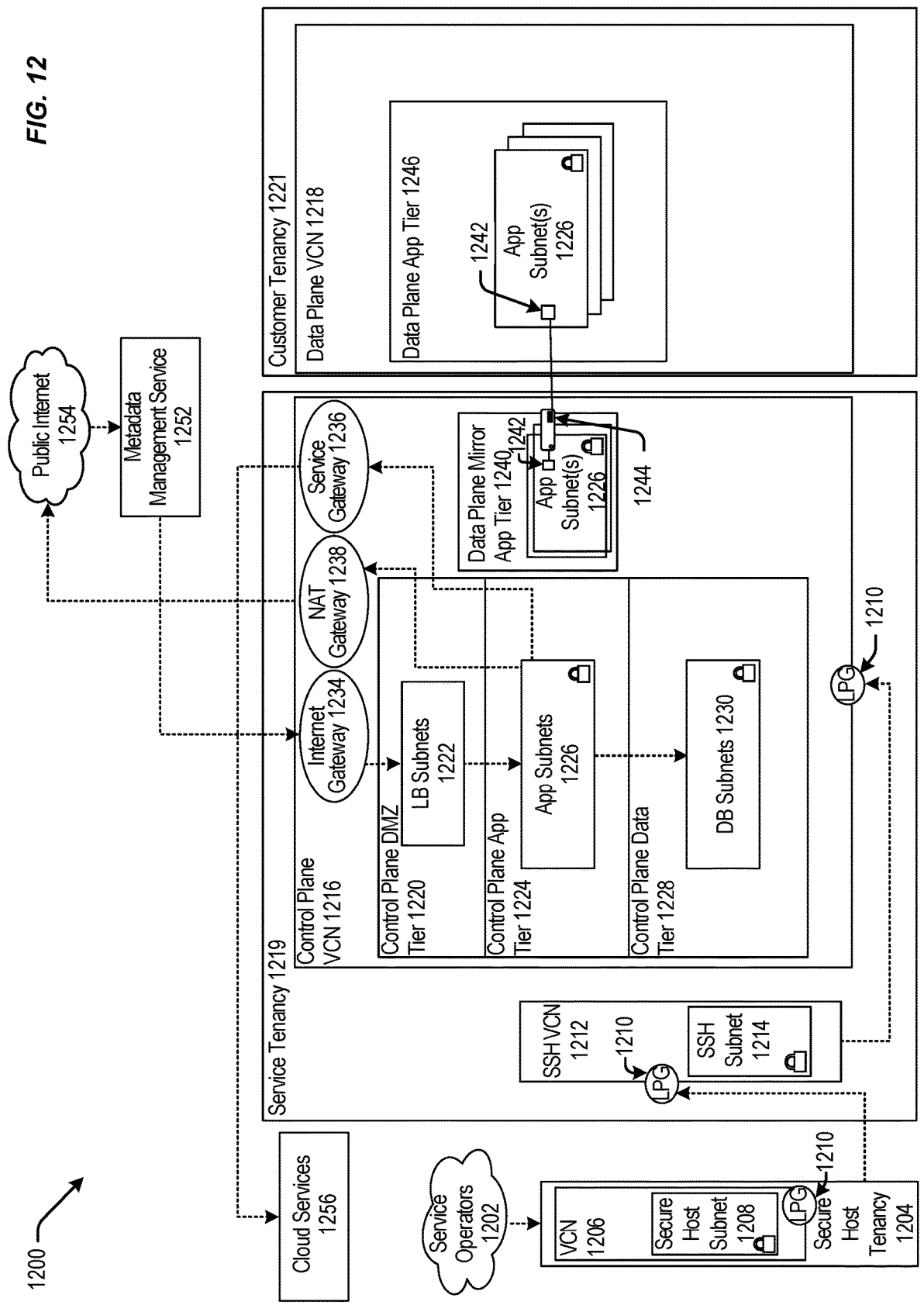
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1102 of FIG. 11) can be communicatively coupled to a secure host tenancy 1204 (e.g., the secure host tenancy 1104 of FIG. 11) that can include a virtual cloud network (VCN) 1206 (e.g., the VCN 1106 of FIG. 11) and a secure host subnet 1208 (e.g., the secure host subnet 1108 of FIG. 11). The VCN 1206 can include a local peering gateway (LPG) 1210 (e.g., the LPG 1110 of FIG. 11) that can be communicatively coupled to a secure shell (SSH) VCN 1212 (e.g., the SSH VCN 1112 of FIG. 11) via an LPG 1110 contained in the SSH VCN 1212. The SSH VCN 1212 can include an SSH subnet 1214 (e.g., the SSH subnet 1114 of FIG. 11), and the SSH VCN 1212 can be communicatively coupled to a control plane VCN 1216 (e.g., the control plane VCN 1116 of FIG. 11) via an LPG 1210 contained in the control plane VCN 1216. The control plane VCN 1216 can be contained in a service tenancy 1219 (e.g., the service tenancy 1119 of FIG. 11), and the data plane VCN 1218 (e.g., the data plane VCN 1118 of FIG. 11) can be contained in a customer tenancy 1221 that may be owned or operated by users, or customers, of the system.

The control plane VCN 1216 can include a control plane DMZ tier 1220 (e.g., the control plane DMZ tier 1120 of FIG. 11) that can include LB subnet(s) 1222 (e.g., LB subnet(s) 1122 of FIG. 11), a control plane app tier 1224 (e.g., the control plane app tier 1124 of FIG. 11) that can include app subnet(s) 1226 (e.g., app subnet(s) 1126 of FIG. 11), a control plane data tier 1228 (e.g., the control plane data tier 1128 of FIG. 11) that can include database (DB) subnet(s) 1230 (e.g., similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g., the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g., the service gateway 1136 of FIG. 11) and a network address translation (NAT) gateway 1238 (e.g., the NAT gateway 1138 of FIG. 11). The control plane VCN 1216 can include the service gateway 1236 and the NAT gateway 1238.

The control plane VCN 1216 can include a data plane mirror app tier 1240 (e.g., the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g., the VNIC of 1142) that can execute a compute instance 1244 (e.g., similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g., the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g., the metadata management service 1152 of FIG. 11) that can be communicatively coupled to public Internet 1254 (e.g., public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g., cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
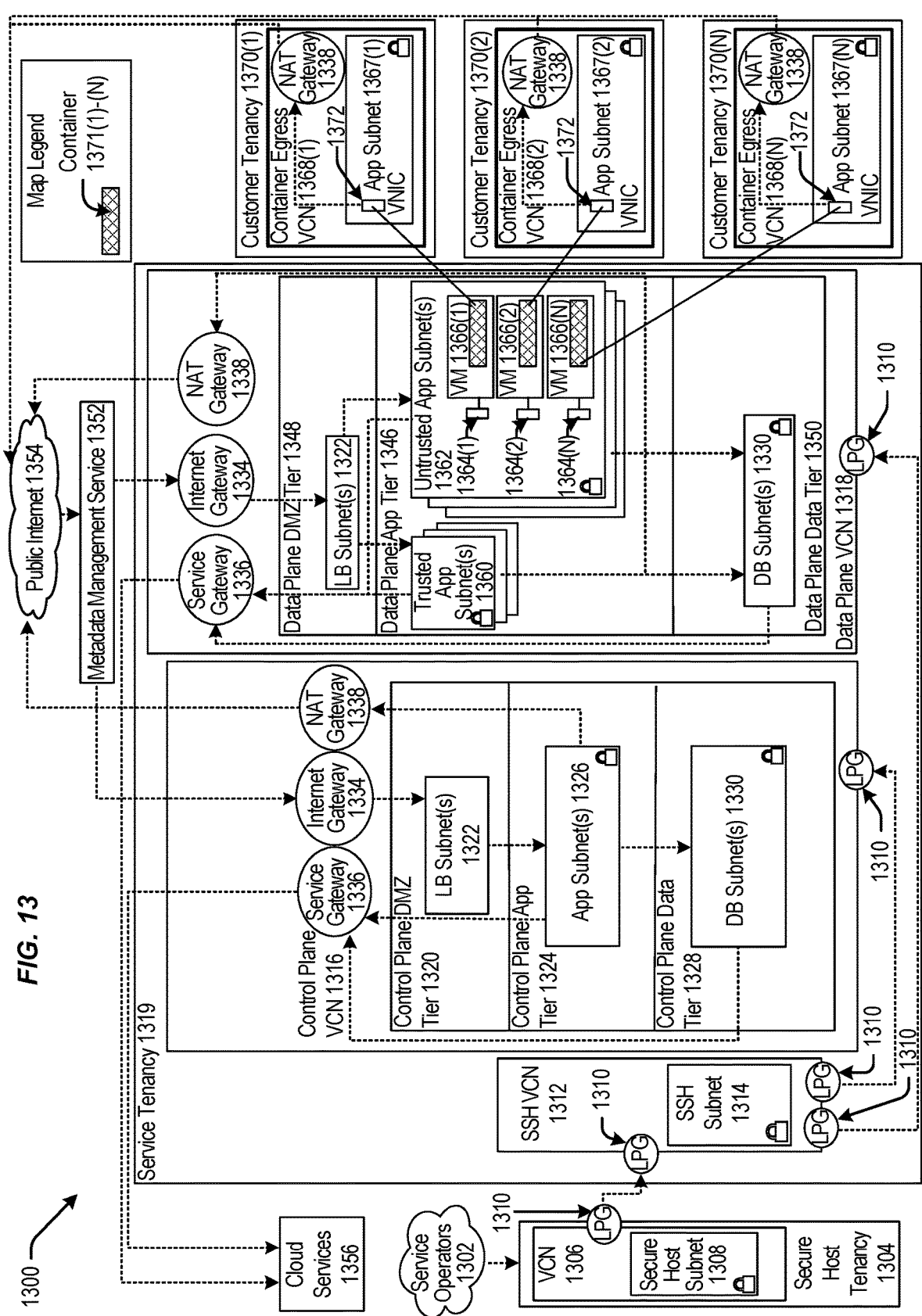
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1102 of FIG. 11) can be communicatively coupled to a secure host tenancy 1304 (e.g., the secure host tenancy 1104 of FIG. 11) that can include a virtual cloud network (VCN) 1306 (e.g., the VCN 1106 of FIG. 11) and a secure host subnet 1308 (e.g., the secure host subnet 1108 of FIG. 11). The VCN 1306 can include an LPG 1310 (e.g., the LPG 1110 of FIG. 11) that can be communicatively coupled to an SSH VCN 1312 (e.g., the SSH VCN 1112 of FIG. 11) via an LPG 1310 contained in the SSH VCN 1312. The SSH VCN 1312 can include an SSH subnet 1314 (e.g., the SSH subnet 1114 of FIG. 11), and the SSH VCN 1312 can be communicatively coupled to a control plane VCN 1316 (e.g., the control plane VCN 1116 of FIG. 11) via an LPG 1310 contained in the control plane VCN 1316 and to a data plane VCN 1318 (e.g., the data plane 1118 of FIG. 11) via an LPG 1310 contained in the data plane VCN 1318. The control plane VCN 1316 and the data plane VCN 1318 can be contained in a service tenancy 1319 (e.g., the service tenancy 1119 of FIG. 11).

The control plane VCN 1316 can include a control plane DMZ tier 1320 (e.g., the control plane DMZ tier 1120 of FIG. 11) that can include load balancer (LB) subnet(s) 1322 (e.g., LB subnet(s) 1122 of FIG. 11), a control plane app tier 1324 (e.g., the control plane app tier 1124 of FIG. 11) that can include app subnet(s) 1326 (e.g., similar to app subnet(s) 1126 of FIG. 11), a control plane data tier 1328 (e.g., the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 11) and a network address translation (NAT) gateway 1338 (e.g., the NAT gateway 1138 of FIG. 11). The control plane VCN 1316 can include the service gateway 1336 and the NAT gateway 1338.

The data plane VCN 1318 can include a data plane app tier 1346 (e.g., the data plane app tier 1146 of FIG. 11), a data plane DMZ tier 1348 (e.g., the data plane DMZ tier 1148 of FIG. 11), and a data plane data tier 1350 (e.g., the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g., public Internet 1154 of FIG. 11).

The Internet gateway 1334 contained in the control plane VCN 1316 and contained in the data plane VCN 1318 can be communicatively coupled to a metadata management service 1352 (e.g., the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371 (1)-(N) may be communicatively coupled to the customer tenancy 1370 and may be configured to transmit or receive data from the customer tenancy 1370. The containers 1371 (1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
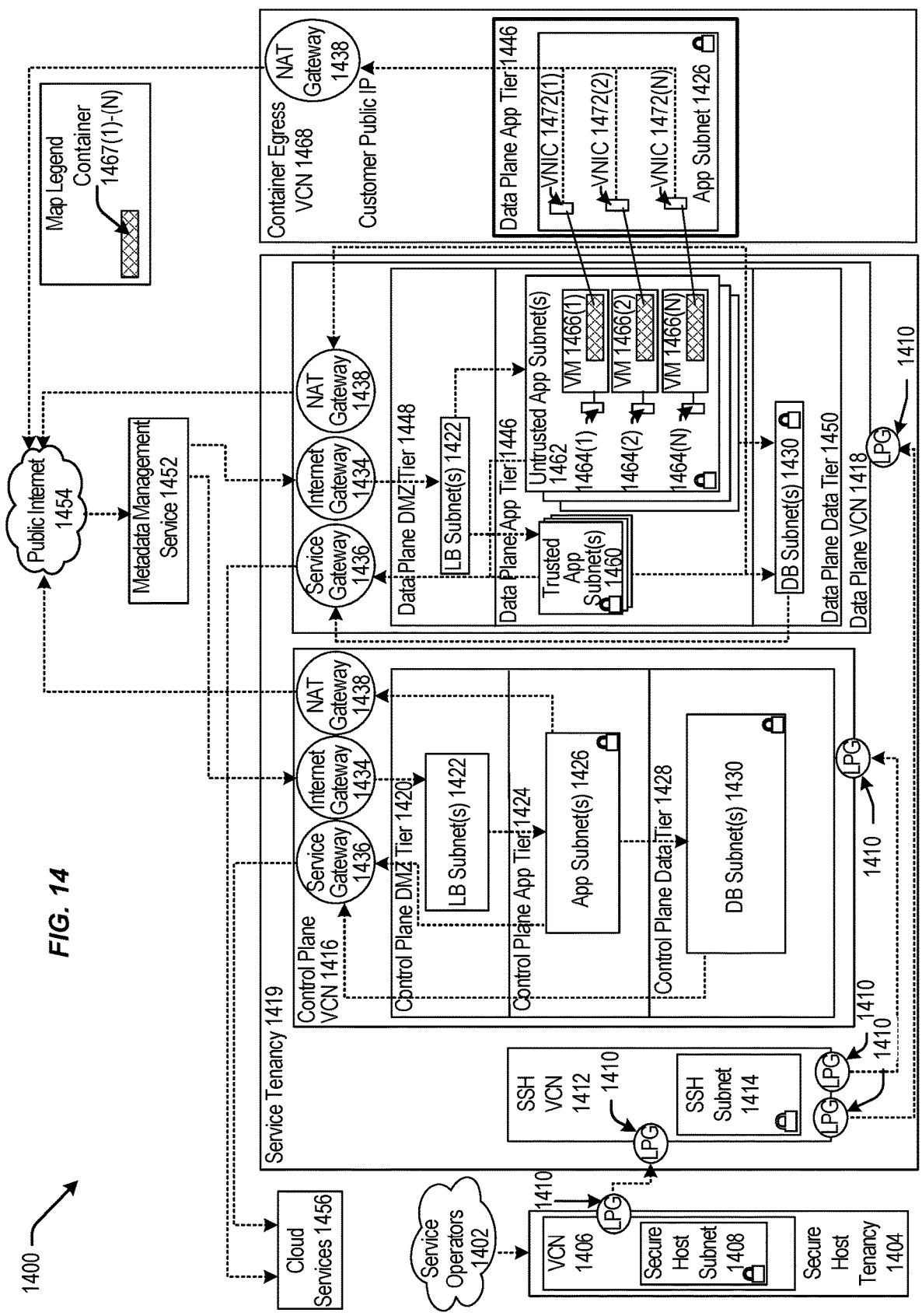
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1102 of FIG. 11) can be communicatively coupled to a secure host tenancy 1404 (e.g., the secure host tenancy 1104 of FIG. 11) that can include a virtual cloud network (VCN) 1406 (e.g., the VCN 1106 of FIG. 11) and a secure host subnet 1408 (e.g., the secure host subnet 1108 of FIG. 11). The VCN 1406 can include an LPG 1410 (e.g., the LPG 1110 of FIG. 11) that can be communicatively coupled to an SSH VCN 1412 (e.g., the SSH VCN 1112 of FIG. 11) via an LPG 1410 contained in the SSH VCN 1412. The SSH VCN 1412 can include an SSH subnet 1414 (e.g., the SSH subnet 1114 of FIG. 11), and the SSH VCN 1412 can be communicatively coupled to a control plane VCN 1416 (e.g., the control plane VCN 1116 of FIG. 11) via an LPG 1410 contained in the control plane VCN 1416 and to a data plane VCN 1418 (e.g., the data plane 1118 of FIG. 11) via an LPG 1410 contained in the data plane VCN 1418. The control plane VCN 1416 and the data plane VCN 1418 can be contained in a service tenancy 1419 (e.g., the service tenancy 1119 of FIG. 11).

The control plane VCN 1416 can include a control plane DMZ tier 1420 (e.g., the control plane DMZ tier 1120 of FIG. 11) that can include LB subnet(s) 1422 (e.g., LB subnet(s) 1122 of FIG. 11), a control plane app tier 1424 (e.g., the control plane app tier 1124 of FIG. 11) that can include app subnet(s) 1426 (e.g., app subnet(s) 1126 of FIG. 11), a control plane data tier 1428 (e.g., the control plane data tier 1128 of FIG. 11) that can include DB subnet(s) 1430 (e.g., DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 11) and a network address translation (NAT) gateway 1438 (e.g., the NAT gateway 1138 of FIG. 11). The control plane VCN 1416 can include the service gateway 1436 and the NAT gateway 1438.

The data plane VCN 1418 can include a data plane app tier 1446 (e.g., the data plane app tier 1146 of FIG. 11), a data plane DMZ tier 1448 (e.g., the data plane DMZ tier 1148 of FIG. 11), and a data plane data tier 1450 (e.g., the data plane data tier 1150 of FIG. 11). The data plane DMZ tier 1448 can include LB subnet(s) 1422 that can be communicatively coupled to trusted app subnet(s) 1460 (e.g., trusted app subnet(s) 1360 of FIG. 13) and untrusted app subnet(s) 1462 (e.g., untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154 of FIG. 11).

The Internet gateway 1434 contained in the control plane VCN 1416 and contained in the data plane VCN 1418 can be communicatively coupled to a metadata management service 1452 (e.g., the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
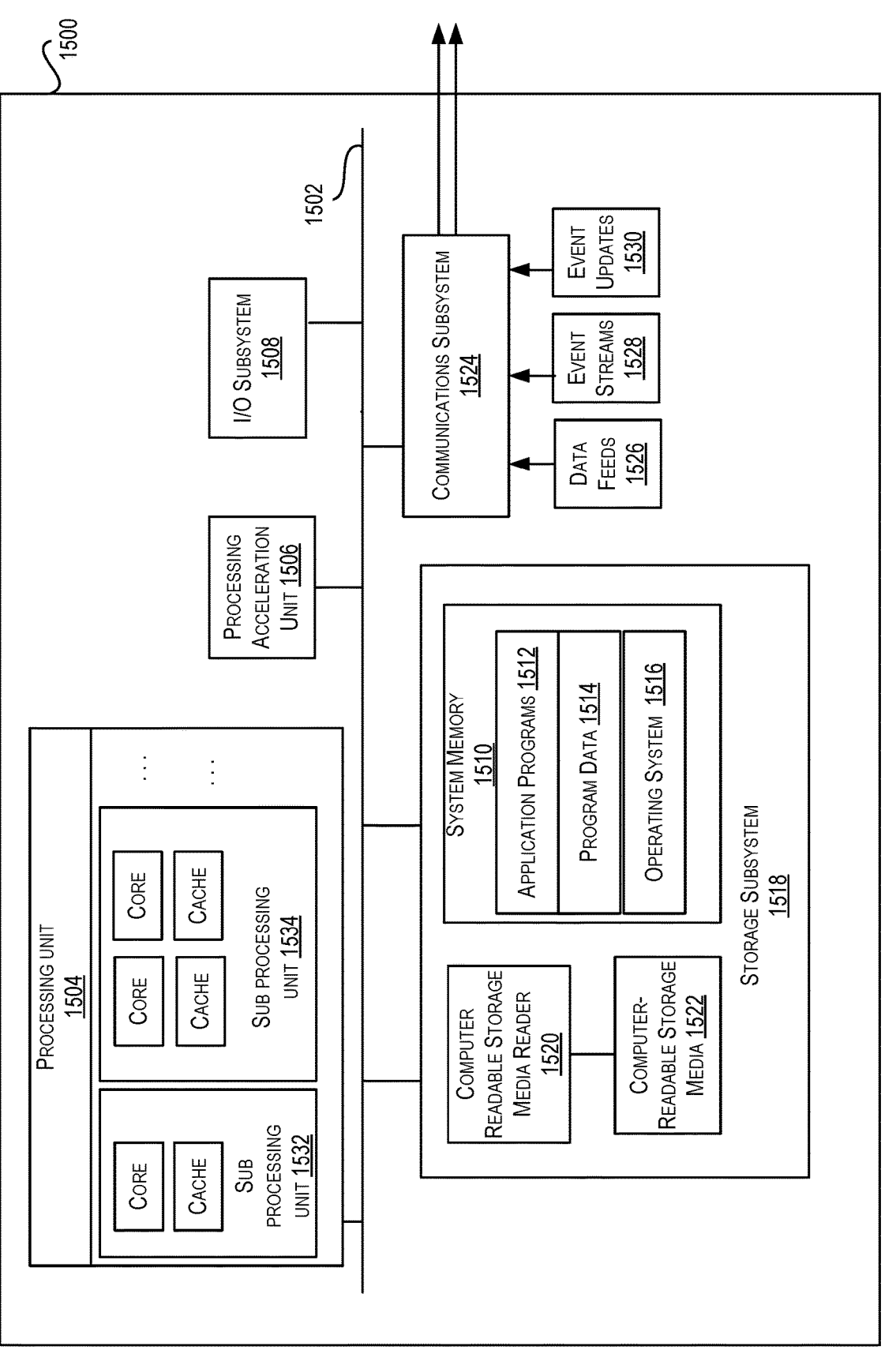
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1518 may also provide a tangible computer-readable storage medium for storing the basic programming and data constructs that provide the functionality of some embodiments. Software (programs, code services, instructions) that when executed by a processor provide the functionality described above may be stored in storage subsystem 1518. These software services or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

accessing, by a computing system, a first time series comprising a first plurality of data points and a second time series comprising a second plurality of data points, the first plurality of data points comprising a first data point associated with a first time step and a first value, the second plurality of data points comprising a second data point associated with a second time step and a second value;

determining, by the computing system, a grouped aggregated data point using the first time series and the second time series by:

identifying, by the computing system, at least one additional first data point adjacent to the first data point in the first time series and aggregating the first value of the first data point and a value of the at least one additional first data point to generate a first aggregated data point, the first aggregated data point associated with the first time step;

identifying, by the computing system, at least one additional second data point adjacent to the second data point in the second time series and aggregating the second value of the second data point and a value of the at least one additional second data point to generate a second aggregated data point, the second aggregated data point associated with the second time step;

aligning, by the computing system, the first aggregated data point and the second aggregated data point based at least in part on the first time step matching the second time step; and determining, by the computing system, the grouped aggregated data point by summing a first value of the first aggregated data point and a second value of the second aggregated data point based at least in part on the alignment;

generating, by the computing system, a new grouped aggregated time series based at least in part on the grouped aggregated data point;

determining, by the computing system, a first set of input values for a machine learning model based at least in part on the new grouped aggregated time series;

extracting, by the computing system, a feature from the first set of input values of the new grouped aggregated time series;

using, by the computing system, the extracted feature and the new grouped aggregated time series to generate a first grouped aggregated forecasted future value based at least in part on the first set of input values and the machine learning model, wherein the machine learning model uses the extracted feature and the first set of input values to predict a trend in the first grouped aggregated forecasted future value and wherein the machine learning model determines the first grouped aggregated forecasted future value by determining a correlation between at least a first input value and a second input value in the first set of input values, wherein the first input value represents a first grouped aggregated data point and the second input value represents a second grouped aggregated data point; and outputting, by the computing system, the first grouped aggregated forecasted future value via a user interface of the computing system.

2. The method of claim 1, wherein the first time series further comprises a third data point associated with a third time step and a third value, the third data point being adjacent to the first data point, wherein the second time series further comprises a fourth data point associated with a fourth time step and a fourth value, the fourth data point being adjacent to the second data point, and wherein the method further comprises:

determining a blended aggregated data point by summing the first value, the second value, the third value associated with the third data point, and the fourth value associated with the fourth data point;

determining a blended aggregated time series based at least in part on the blended aggregated data point;

determining a second set of input values for a machine learning model based at least in part on the blended aggregated time series; and determining a second forecasted future value based at least in part on the second set of input values and using the machine learning model.

3. The method of claim 1, wherein the method further comprises:

determining a third forecasted value using the second time series, a first future time step of the first grouped aggregated forecasted future value matching a second future time step of the third forecasted value; and subtracting the third forecasted value from the first grouped aggregated forecasted future value to determine a first final forecasted value.

4. The method of claim 2, wherein the second forecasted future value is a first blended aggregated forecasted value, and wherein the method further comprises:

determining a second grouped aggregated forecasted future value based at least in part on the first time series and the second time series; and determining a second final forecasted value based at least in a part on subtracting the second grouped aggregated forecasted future value from the first blended aggregated forecasted value.

5. The method of claim 1, wherein the machine learning model implements a forecasting technique, and wherein the first set of input values are configured for the forecasting technique.

6. The method of claim 1, wherein the first set of input values comprises the trend, a seasonality, an autocorrelation, a nonlinearity, or a heterogeneity of the new grouped aggregated time series.

7. The method of claim 2, wherein the method further comprises determining a first grouped aggregated time step for the first grouped aggregated data point based at least in part on a younger of the first data point and the third data point.

8. A computing system, comprising:

one or more processors; and a computer-readable medium including instructions that, when executed by the one or more processors, cause the computing system to perform operations comprising:

accessing a first time series comprising a first plurality of data points and a second time series comprising a second plurality of data points, the first plurality of data points comprising a first data point associated with a first time step and a first value, the second plurality of data points comprising a second data point associated with a second time step and a second value;

determining a grouped aggregated data point using the first time series and the second time series by:

identifying, by the computing system, at least one additional first data point adjacent to the first data point in the first time series and aggregating the first value of the first data point and a value of the at least one additional first data point to generate a first aggregated data point, the first aggregated data point associated with the first time step;

identifying, by the computing system, at least one additional second data point adjacent to the second data point in the second time series and aggregating the second value of the second data point and a value of the at least one additional second data point to generate a second aggregated data point, the second aggregated data point associated with the second time step;

aligning the first aggregated data point and the second aggregated data point based at least in part on the first time step matching the second time step; and determining the grouped aggregated data point by summing a first value of the first aggregated data point and a second value of the second aggregated data point based at least in part on the alignment;

generating a new grouped aggregated time series based at least in part on the grouped aggregated data point;

determining a first set of input values for a machine learning model based at least in part on the new grouped aggregated time series;

extracting, by the computing system, a feature from the first set of input values of the new grouped aggregated time series;

using the extracted feature and the new grouped aggregated time series to generate a first grouped aggregated forecasted future value based at least in part on the first set of input values input and using the machine learning model, wherein the machine learning model uses the extracted feature and the first set of input values to predict a trend in the first grouped aggregated forecasted future value and wherein the machine learning model determines the first grouped aggregated forecasted future value by determining a correlation between at least a first input value and a second input value in the first set of input values, wherein the first input value represents a first grouped aggregated data point and the second input value represents a second grouped aggregated data point; and outputting the first grouped aggregated forecasted future value via a user interface of the computing system.

9. The computing system of claim 8, wherein the first time series further comprises a third data point associated with a third time step and a third value, the third data point being adjacent to the first data point, wherein the second time series further comprises a fourth data point associated with a fourth time step and a fourth value, the fourth data point being adjacent to the second data point, and wherein the instructions that, when executed by the one or more processors, further cause the computing system to perform operations comprising:

determining a blended aggregated data point by summing the first value, the second value, the third value associated with the third data point, and the fourth value associated with the fourth data point;

determining a blended aggregated time series based at least in part on the blended aggregated data point;

determining a second set of input values for a machine learning model based at least in part on the blended aggregated time series; and determining a second forecasted future value based at least in part on the second set of input values and using the machine learning model.

10. The computing system of claim 8, wherein the instructions that, when executed by the computing system, further cause the computing system to perform operations comprising:

determining a third forecasted value using the second time series, a first future time step of the first grouped aggregated forecasted future value matching a second future time step of the third forecasted value; and subtracting the third forecasted value from the first grouped aggregated forecasted future value to determine a first final forecasted value.

11. The computing system of claim 9, wherein the second forecasted value is a first blended aggregated forecasted value, and wherein the instructions that, when executed by the one or more processors, further cause the computing system to perform operations comprising:

determining a second grouped aggregated forecasted future value based at least in part on the first time series and the second time series; and determining a second final forecasted value based at least in a part on subtracting the second grouped aggregated forecasted future value from the first blended aggregated forecasted value.

12. The computing system of claim 8, wherein the machine learning model implements a forecasting technique, and wherein the first set of input values are configured for the forecasting technique.

13. The computing system of claim 8, wherein the first set of input values comprises the trend, a seasonality, an auto-correlation, a nonlinearity, or a heterogeneity of the new grouped aggregated time series.

14. The computing system of claim 9, wherein the instructions that, when executed by the one or more processors, further cause the computing system to perform operations comprising determining a first blended aggregated time step for the first blended aggregated data point based at least in part on a younger of the first data point and the third data point.

15. A non-transitory computer-readable medium having stored thereon a sequence of instructions that, when executed by one or more processors, causes a computing system to perform operations comprising:

accessing a first time series comprising a first plurality of data points and a second time series comprising a second plurality of data points, the first plurality of data points comprising a first data point associated with a first time step and a first value, the second plurality of data points comprising a second data point associated with a second time step and a second value;

determining a grouped aggregated data point using the first time series and the second time series by:

identifying, by the computing system, at least one additional first data point adjacent to the first data point in the first time series and aggregating the first value of the first data point and a value of the at least one additional first data point to generate a first aggregated data point, the first aggregated data point associated with the first time step;

identifying, by the computing system, at least one additional second data point adjacent to the second data point in the second time series and aggregating the second value of the second data point and a value of the at least one additional second data point to generate a second aggregated data point, the second aggregated data point associated with the second time step;

aligning the first aggregated data point and the second aggregated data point based at least in part on the first time step matching the second time step; and determining the grouped aggregated data point by summing a first value of the first aggregated data point and a second value of the second aggregated data point based at least in part on the alignment;

generating a new grouped aggregated time series based at least in part on the grouped aggregated data point;

determining a first set of input values for a machine learning model based at least in part on the new grouped aggregated time series;

extracting, by the computing system, a feature from the first set of input values of the new grouped aggregated time series;

using the extracted feature and the new grouped aggregated time series to generate a first grouped aggregated forecasted future value based at least in part on the first set of input values and using the machine learning model, wherein the machine learning model uses the extracted feature and the first set of input values to predict a trend in the first grouped aggregated forecasted future value and wherein the machine learning model determines the first grouped aggregated forecasted future value by determining a correlation between at least a first input value and a second input value in the first set of input values, wherein the first input value represents a first grouped aggregated data point and the second input value represents a second grouped aggregated data point; and outputting the first grouped aggregated forecasted future value via a user interface of the computing system.

16. The non-transitory computer-readable medium of claim 15, wherein the first time series further comprises a third data point associated with a third time step and a third value, the third data point being adjacent to the first data point, wherein the second time series further comprises a fourth data point associated with a fourth time step and a fourth value, the fourth data point being adjacent to the second data point, and wherein the instructions that, when executed by the one or more processors, further cause the computing system to perform operations comprising:

determining a blended aggregated data point by summing the first value, the second value, the third value associated with the third data point, and the fourth value associated with the fourth data point;

determining a blended aggregated time series based at least in part on the blended aggregated data point;

determining a second set of input values for a machine learning model based at least in part on the blended aggregated time series; and determining a second forecasted future value based at least in part on the second set of input values and using the machine learning model.

17. The non-transitory computer-readable medium of claim 15, wherein the instructions that, when executed by the one or more processors, further cause the computing system to perform operations comprising:

generating a third forecasted value using the second time series, a first future time step of the first grouped aggregated forecasted future value matching a second future time step of the third forecasted value; and subtracting the third forecasted value from the first grouped aggregated forecasted future value to reach a first final forecasted value.

18. The non-transitory computer readable medium of claim 16, wherein the second forecasted value is a first blended aggregated forecasted value, and wherein the instructions that, when executed by the one or more processors, further cause the computing system to perform operations comprising:

determining a second grouped aggregated forecasted future value based at least in part on the first time series and the second time series; and determining a second final forecasted value based at least in part on subtracting the second grouped aggregated forecasted future value from the first blended aggregated forecasted value.

19. The non-transitory computer-readable medium of claim 15, wherein the machine learning model implements a forecasting technique, and wherein the first set of input values are configured for the forecasting technique.

20. The non-transitory computer-readable medium of claim 15, wherein the first set of input values comprises the trend, a seasonality, an autocorrelation, a nonlinearity, or a heterogeneity of the new grouped aggregated time series.

* * * * *